United States Patent
Kiso et al.

(10) Patent No.: US 10,751,803 B2
(45) Date of Patent: Aug. 25, 2020

(54) INSERT CLAMPING MECHANISM OF INDEXABLE GROOVING TOOL AND CLAMPING TOOL

(71) Applicant: MITSUBISHI MATERIALS CORPORATION, Tokyo (JP)

(72) Inventors: Takuma Kiso, Tokyo (JP); Shoichiro Watanabe, Tokyo (JP); Hiroyuki Norigoe, Tokyo (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 16/079,113

(22) PCT Filed: Feb. 9, 2017

(86) PCT No.: PCT/JP2017/004806
§ 371 (c)(1),
(2) Date: Aug. 23, 2018

(87) PCT Pub. No.: WO2017/145782
PCT Pub. Date: Aug. 31, 2017

(65) Prior Publication Data
US 2019/0054543 A1 Feb. 21, 2019

(30) Foreign Application Priority Data

Feb. 26, 2016 (JP) .................................. 2016-036120

(51) Int. Cl.
*B23B 27/04* (2006.01)
*B23B 29/04* (2006.01)
(Continued)

(52) U.S. Cl.
CPC .............. *B23B 27/04* (2013.01); *B23B 27/08* (2013.01); *B23B 27/16* (2013.01);
(Continued)

(58) Field of Classification Search
CPC ................ B23B 27/16; B23B 2205/02; B23B 2205/125; B23B 2260/0785; Y10T 407/2288
See application file for complete search history.

(56) References Cited

U.S. PATENT DOCUMENTS 5,035,545 A    7/1991  Zinner
5,803,675 A *  9/1998  Von Haas ............... B23B 27/04
                                                407/107
(Continued)

FOREIGN PATENT DOCUMENTS

CN    102753289 A    10/2012
CN    203156128 U    8/2013
(Continued)

OTHER PUBLICATIONS

International Search Report dated Apr. 11, 2017, issued for PCT/JP2017/004806 and English translation thereof.
(Continued)

*Primary Examiner* — Nicole N Ramos
(74) *Attorney, Agent, or Firm* — Locke Lord LLP

(57) ABSTRACT

In an insert clamping mechanism of an indexable grooving tool of the present invention, a shaft portion of a clamping tool has a major axis and a minor axis orthogonal to each other on a center axis thereof in a cross-sectional view perpendicular to the center axis. At least one end portion of the both end portions positioned on the major axis in an outer circumference of the shaft portion is formed into a recessed shape or a linear shape and is disposed not to come into contact with an upper wall and a lower wall of an opening-closing operation slit. Support portions are respectively formed in parts adjacent to the end portions on both sides around the center axis along the shaft portion.

4 Claims, 10 Drawing Sheets

(51) Int. Cl.
*B23B 27/16* (2006.01)
*B23B 27/08* (2006.01)

(52) U.S. Cl.
CPC ........ *B23B 27/1659* (2013.01); *B23B 29/043* (2013.01); *B23B 2200/16* (2013.01); *B23B 2205/02* (2013.01); *B23B 2205/12* (2013.01); *B23B 2205/125* (2013.01); *B23B 2260/0785* (2013.01)

(56) References Cited

U.S. PATENT DOCUMENTS

| | | | |
|---|---|---|---|
| 6,241,429 B1* | 6/2001 | Schafer | B23B 27/04 407/102 |
| 9,475,122 B2* | 10/2016 | Andersson | B23B 27/045 |
| 2002/0054792 A1* | 5/2002 | Hansson | B23B 27/04 407/72 |
| 2013/0167345 A1* | 7/2013 | Hecht | B23B 29/04 29/267 |
| 2015/0003924 A1* | 1/2015 | Jansson | B23B 27/16 407/110 |

FOREIGN PATENT DOCUMENTS

| | | |
|---|---|---|
| CN | 104249166 A | 12/2014 |
| EP | 0385495 A1 | 9/1990 |
| JP | 03-202204 A | 9/1991 |
| JP | 09-505003 A | 5/1997 |
| JP | 2001-138106 A | 5/2001 |
| JP | 2015-009359 A | 1/2015 |

OTHER PUBLICATIONS

Office Action dated May 29, 2019, issued for the Chinese patent application No. 201780012981.3 and English translation thereof.

* cited by examiner

US 10,751,803 B2

INSERT CLAMPING MECHANISM OF INDEXABLE GROOVING TOOL AND CLAMPING TOOL

TECHNICAL FIELD

The present invention relates to an insert clamping mechanism for attaching and detaching a grooving cutting insert with respect to an insert mounting seat in an indexable grooving tool performing grooving, cutting-off, or the like in a cutting target material, and a clamping tool.

Priority is claimed on Japanese Patent Application No. 2016-036120, filed on Feb. 26, 2016, the content of which is incorporated herein by reference.

BACKGROUND ART

In the related art, an indexable grooving tool performing grooving, cutting-off, or the like (which will hereinafter be simply abbreviated to grooving sometimes) by cutting a cutting target material, which is formed of a metal material or the like and has a columnar shape or a cylindrical shape, with a cutting edge of a grooving cutting insert on an outer circumferential surface, an inner circumferential surface, end surfaces orientated in an axial line direction, and the like of the cutting target material while the cutting target material is rotated around an axial line is known.

For example, in an indexable grooving tool of PTL 1 referenced below, a slit-shaped insert mounting seat is formed in an insert holding plate portion of a distal end portion of a tool main body, and a grooving cutting insert having a cutting edge is mounted in the insert mounting seat in an attachable/detachable manner.

Specifically, a slit-shaped opening-closing operation slit communicating with the insert mounting seat is formed in the insert holding plate portion, and the grooving cutting insert can be easily attached and detached with respect to the insert mounting seat by performing an operation of inserting an eccentric body of a key into a keyhole of the opening-closing operation slit. Generally, the key is manufactured of a material harder than that of the tool main body.

A cross section of the eccentric body of the key has a substantially rectangular shape, and each of four corner portions thereof has a projected round shape. Then, when the eccentric body is inserted into the keyhole and a pair of long side regions in the outer circumference of the eccentric body is disposed to face an upper wall and a lower wall of the keyhole, a gap is formed between each of the upper wall and the lower wall, and each of the pair of long side regions.

If the eccentric body is rotated around its center axis by 90° and a pair of short side regions in the outer circumference of the eccentric body is disposed to face the upper wall and the lower wall of the keyhole by operating the key from this state, the short side regions pressurize the upper wall and the lower wall in an orientation of being separated from each other. As the upper wall and the lower wall of the keyhole are pressurized, a clamping finger (upper jaw portion) of the insert holding plate portion is elastically deformed. Consequently, a distance between a top wall and a bottom wall of the insert mounting seat increases, so that the grooving cutting insert can be inserted with respect to the insert mounting seat.

In addition, in a state where the grooving cutting insert is inserted in the insert mounting seat, if the key is operated again and the pair of long side regions of the eccentric body is disposed to face the upper wall and the lower wall of the keyhole, the clamping finger is deformed to be restored and the grooving cutting insert is clamped with respect to the insert mounting seat.

According to an insert clamping mechanism having such a configuration, the grooving cutting insert can be clamped without damaging the top wall or the bottom wall of the insert mounting seat.

CITATION LIST

Patent Literature

[PTL 1] Japanese Unexamined Patent Application, First Publication No. 2015-9359

SUMMARY OF INVENTION

Technical Problem

However, the above-described insert clamping mechanism of an indexable grooving tool in the related art has the following problems.

In PTL 1, each of middle portions (surfaces of shoulder portions) of a pair of short side regions of an eccentric body comes into contact with each of middle portions closest to a center axis of the eccentric body in an upper wall and a lower wall in a keyhole of an opening-closing operation slit and is pressurized in an orientation in which the upper wall and the lower wall are separated from each other, so that a clamping finger is elastically deformed.

However, when a key is operated, corner portions of the eccentric body are strongly rubbed with respect to the middle portion of the upper wall and the middle portion of the lower wall of the keyhole. Accordingly, the middle portions are likely to be worn out (abraded). Therefore, the eccentric body can no longer be able to sufficiently pressurize the upper wall and the lower wall which have been worn out, so that there is concern that the amount of elastic deformation of the clamping finger is reduced and a grooving cutting insert cannot be clamped.

Although a tool main body having a worn out opening-closing operation slit can be replaced with an unused (new) tool main body, the tool main body needs to be frequently replaced and the cost rises to that extent.

The present invention has been made in consideration of the foregoing circumstances, and an object thereof is to provide an insert clamping mechanism of an indexable grooving tool in which reduction of the amount of elastic deformation of an insert holding plate portion can be suppressed and the grooving cutting insert can be stably clamped with respect to an insert mounting seat in a long lasting manner even in a case where an upper wall and a lower wall of an opening-closing operation slit are worn out, and a clamping tool.

Solution to Problem

According to an aspect of the present invention, there is provided an insert clamping mechanism of an indexable grooving tool, the insert clamping mechanism including: an insert holding plate portion which is provided in a tool main body; an insert mounting seat which penetrates the insert holding plate portion in a thickness direction of the insert holding plate portion, extends in a slit shape, and is configured for a grooving cutting insert having a cutting edge to be mounted detachably, one end portion of both end portions of the insert mounting seat along an extending direction being open on an end surface of the insert holding plate portion; an opening-closing operation slit which is formed into a slit shape penetrating the insert holding plate portion in the thickness direction and communicates with the other end portion of the both end portions of the insert mounting seat along the extending direction; and a clamping tool which is configured to be inserted into the opening-closing operation slit, wherein an upper wall and a lower wall disposed to face each other in a separated manner are formed in the opening-closing operation slit, wherein the insert holding plate portion is configured to be elastically deformable such that the upper wall and the lower wall are separated from each other, wherein the clamping tool has a shaft portion configured to be inserted between the upper wall and the lower wall, and wherein in a cross-sectional view perpendicular to a center axis of the shaft portion, the shaft portion has a major axis and a minor axis orthogonal to each other on the center axis, an outer diameter of the shaft portion in a minor axis direction is less than a distance between the upper wall and the lower wall through the center axis along a vertical direction in which the upper wall and the lower wall face each other, and an outer diameter of the shaft portion in a major axis direction is more than the distance, at least one end portion of the both end portions positioned on the major axis in an outer circumference of the shaft portion is formed into a recessed shape or a linear shape and is disposed not to come into contact with the upper wall and the lower wall, and support portions having a largest outer diameter in the shaft portion are respectively formed in parts adjacent to the end portions on both sides around the center axis along the shaft portion.

In addition, according to another aspect of the present invention, there is provided a clamping tool including a shaft portion which is configured to be inserted between an upper wall and a lower wall disposed to face each other in a separated manner in an opening-closing operation slit among an insert mounting seat and an opening-closing operation slit, which are formed to penetrate the insert holding plate portion in a thickness direction of the insert holding plate portion and communicate each other, wherein in a cross-sectional view perpendicular to a center axis of the shaft portion, the shaft portion has a major axis and a minor axis orthogonal to each other on the center axis, an outer diameter of the shaft portion in a minor axis direction is less than a distance between the upper wall and the lower wall through the center axis along a vertical direction in which the upper wall and the lower wall face each other, and an outer diameter of the shaft portion in a major axis direction is more than the distance, at least one end portion of the both end portions positioned on the major axis in an outer circumference of the shaft portion is formed into a recessed shape or a linear shape and is disposed not to come into contact with the upper wall and the lower wall, and support portions having a largest outer diameter in the shaft portion are respectively formed in parts adjacent to the end portions on both sides around the center axis along the shaft portion.

An operation is performed as follows in order to attach and detach the grooving cutting insert with respect to the insert mounting seat using the insert clamping mechanism of an indexable grooving tool, and the clamping tool.

When the grooving cutting insert is mounted in the insert mounting seat, first, the shaft portion of the clamping tool is inserted between the upper wall and the lower wall of the opening-closing operation slit. At this time, in a cross-sectional view perpendicular to the center axis of the shaft portion, the shaft portion is disposed such that regions in the outer circumference of the shaft portion oriented toward both sides (both outer sides) in the minor axis direction respectively face the upper wall and the lower wall. In this state, a gap is formed between each of the regions oriented in the minor axis direction of the shaft portion, and each of the upper wall and the lower wall of the opening-closing operation slit.

Subsequently, the clamping tool is operated to rotate the shaft portion around its center axis by 90° with respect to the upper wall and the lower wall of the opening-closing operation slit. Accordingly, regions in the outer circumference of the shaft portion oriented toward both sides (both outer sides) in the major axis direction are disposed to respectively face the upper wall and the lower wall, and a pair of the support portions disposed around the center axis in a separated manner with the end portions positioned on the major axis interposed therebetween in the outer circumference of the shaft portion is brought into contact with the upper wall or the lower wall of the opening-closing operation slit. Then, the shaft portion is pressurized in an orientation in which the upper wall and the lower wall are separated from each other.

Since the upper wall and the lower wall of the opening-closing operation slit are pressurized in the orientation of being separated from each other, the insert holding plate portion (upper jaw portion thereof, for example) is elastically deformed, and the distance between the upper wall and the lower wall increases. Consequently, a distance between a top wall and a bottom wall of the insert mounting seat communicating with the opening-closing operation slit also increases, so that the insert mounting seat is in a state of being able to receive the grooving cutting insert (hereinafter, this state will be referred to as an open state of the insert mounting seat, and will be sometimes referred to as a "stably open state" in a case of being distinguished from a "maximum open state" (which will be described below)). Then, the grooving cutting insert can be inserted with respect to the insert mounting seat.

After the grooving cutting insert is inserted in the insert mounting seat, the shaft portion is rotated around its center axis by 90° with respect to the upper wall and the lower wall of the opening-closing operation slit. Accordingly, the regions in the outer circumference of the shaft portion oriented toward both sides in the minor axis direction are disposed to respectively face the upper wall and the lower wall, and pressurization by the shaft portion with respect to the upper wall and the lower wall is canceled.

If pressurization to the upper wall and the lower wall of the opening-closing operation slit is canceled, the insert holding plate portion is deformed to be restored, and the distance between the upper wall and the lower wall is reduced. Consequently, the distance between the top wall and the bottom wall of the insert installation communicating with the seat opening-closing operation slit is also reduced, and the insert mounting seat is in a state of clamping the grooving cutting insert (hereinafter, this state will be referred to as a closed state of the insert mounting seat).

When the grooving cutting insert is removed from the insert mounting seat, an operation may be performed in a reverse procedure of the procedure described above. That is, the insert mounting seat is brought into the open state by operating the clamping tool, and then the grooving cutting insert can be removed from the insert mounting seat.

According to the insert clamping mechanism of an indexable grooving tool, and the clamping tool of the present invention, the shaft portion of the clamping tool has the major axis and the minor axis in a cross-sectional view perpendicular to its center axis and is formed into an elliptical shape, an oval shape, or a polygonal shape, for example. Then, in this cross-sectional view, at least one end portion of a pair of end portions (both end portions) positioned on the major axis in the outer circumference of the shaft portion is formed into a recessed shape (that is, a groove shape) or a linear shape (that is, a flat surface shape) and is in non-contact with the upper wall and the lower wall of the opening-closing operation slit. In addition, the support portions having the largest outer diameter in the shaft portion are respectively formed in the parts adjacent to the end portions on both sides around the center axis along the shaft portion.

That is, in the present invention, when the clamping tool is operated, the support portion having the largest outer diameter in the outer circumference of the shaft portion is strongly rubbed against each of the parts closest to the center axis of the shaft portion in the upper wall and the lower wall of the opening-closing operation slit (for example, each of middle portions of the upper wall and the lower wall). Therefore, as the clamping tool is repetitively operated, the part of the upper wall and the part of the lower wall of the opening-closing operation slit are more significantly worn out than other portions.

Then, in a state where the regions oriented toward both sides of the shaft portion in the major axis direction are disposed to respectively face the upper wall and the lower wall of the opening-closing operation slit (that is, when the insert mounting seat is brought into the open state), the both end portions positioned on the major axis in the outer circumference of the shaft portion are disposed to respectively face the parts in the upper wall and the lower wall which have been significantly worn out. Here, the end portions positioned on the major axis in the outer circumference of the shaft portion are not brought into contact with the parts in the upper wall and the lower wall which have been significantly worn out (end portions are separated from the parts). In addition, the pair of support portions disposed around the center axis in a separated manner with the end portion interposed therebetween in the outer circumference of the shaft portion also does not come into contact with the parts in the upper wall and the lower wall which have been significantly worn out.

Specifically, when the insert mounting seat is brought into the open state, the support portions of the shaft portion are not brought into contact with the parts in the upper wall and the lower wall of the opening-closing operation slit which have been significantly worn out but are brought into contact with parts which have a small wear amount and are adjacent to the parts having a large wear amount.

Therefore, for example, even in a case where the upper wall and the lower wall of the opening-closing operation slit are worn out, the shaft portion reliably pressurizes the upper wall and the lower wall, so that the insert holding plate portion can be elastically deformed in a stable manner and reduction of the amount of elastic deformation thereof can be remarkably suppressed.

Furthermore, a pair of support portions of the shaft portion is provided with the end portions positioned on the major axis interposed therebetween in the outer circumference of the shaft portion, and the outer diameter is maximized in the shaft portion, thereby exhibiting the following operational effects.

That is, when the support portions of the shaft portion go through the upper wall and the lower wall of the opening-closing operation slit, the insert mounting seat is brought into a maximally open state (maximum open state). Compared to this maximum open state, in the open state (stably open state) and the closed state of the insert mounting seat, the insert mounting seat is in a state open less than the maximum open state. Therefore, in a process from the maximum open state of the insert mounting seat to the stably open state and the closed state, a restoring deformation force of the insert holding plate portion acts, so that an operator operating the clamping tool can feel the touch (click feeling) with favorable operability.

In addition, in the open state (stably open state) of the insert mounting seat, since the pair of support portions separated from each other is brought into contact with the upper wall or the lower wall of the opening-closing operation slit (supported at two points), unintended pivoting around the center axis of the shaft portion with respect to the opening-closing operation slit is minimized, and the posture of the shaft portion is stabilized.

As described above, according to the present invention, even in a case where the upper wall and the lower wall of the opening-closing operation slit are worn out, reduction of the amount of elastic deformation of the insert holding plate portion can be suppressed, and the grooving cutting insert can be stably clamped with respect to the insert mounting seat in a long lasting manner.

In addition, even if the opening-closing operation slit is worn out, since the period for replacement of the tool main body can be elongated, the cost can be reduced by minimizing the frequency of replacing the tool main body.

In addition, in the insert clamping mechanism of an indexable grooving tool, it is preferable that in a cross-sectional view perpendicular to the center axis of the shaft portion, a distance between a pair of the support portions disposed around the center axis in a separated manner with the end portions of the shaft portion interposed therebetween is in a range from 1/8 to 1/3 times the outer diameter of the shaft portion in the minor axis direction.

In addition, in the clamping tool, it is preferable that in a cross-sectional view perpendicular to the center axis of the shaft portion, a distance between a pair of the support portions disposed around the center axis in a separated manner with the end portions of the shaft portion interposed therebetween is in a range from 1/8 to 1/3 times the outer diameter of the shaft portion in the minor axis direction.

In this case, since the distance between the pair of support portions is 1/8 times or greater than that of the outer diameter of the shaft portion in the minor axis direction and a sufficient length is ensured, when the insert mounting seat is brought into the open state (stably open state), the support portions can be disposed to be sufficiently separated from the parts in the upper wall and the lower wall of the opening-closing operation slit which have been significantly worn out. Accordingly, while the insert mounting seat is in the open state, the support portions of the shaft portion can be reliably prevented from coming into contact with the parts in the upper wall and the lower wall of the opening-closing operation slit which have been significantly worn out, and the insert holding plate portion can be elastically deformed in a stable manner, so that the above-described operational effects become more remarkable.

In addition, since the distance between the pair of support portions is 1/3 times or smaller than that of the outer diameter of the shaft portion in the minor axis direction, it is possible to prevent the distance between the support portions from being excessively long and the outer diameter of the shaft portion in the major axis direction from being short. That is, when a sufficiently large difference between the outer diameter in the major axis direction and the outer diameter in the minor axis direction of the shaft portion is ensured and the insert mounting seat is brought into the open state (stably open state), a large distance between the top wall and the bottom wall of the insert mounting seat can be ensured. Accordingly, attaching/detaching operability of the grooving cutting insert with respect to the insert mounting seat can be stably enhanced.

Advantageous Effects of Invention

According to the insert clamping mechanism of an indexable grooving tool, and the clamping tool of the present invention, even in a case where the upper wall and the lower wall of the opening-closing operation slit are worn out, reduction of the amount of elastic deformation of the insert holding plate portion can be suppressed and the grooving cutting insert can be stably clamped with respect to the insert mounting seat in a long lasting manner.

BRIEF DESCRIPTION OF DRAWINGS

FIG. 4(a) is a front view and FIG. 4(b) is a top view.

FIG. 8(a) is a plan view and FIG. 8(b) is a front view.

FIG. 10(a) is a view illustrating a state where regions oriented toward both sides of the shaft portion in a minor axis direction are disposed to respectively face an upper wall and a lower wall of an opening-closing operation slit (closed state of the insert mounting seat), FIG. 10(b) is a view illustrating a state where support portions of the shaft portion hit the upper wall and the lower wall of the opening-closing operation slit (maximum open state of the insert mounting seat), and FIG. 10(c) is a view illustrating a state where regions oriented toward both sides of the shaft portion in a major axis direction are disposed to respectively face the upper wall and the lower wall of the opening-closing operation slit (stably open state of the insert mounting seat).

DESCRIPTION OF EMBODIMENT

Figure 1:
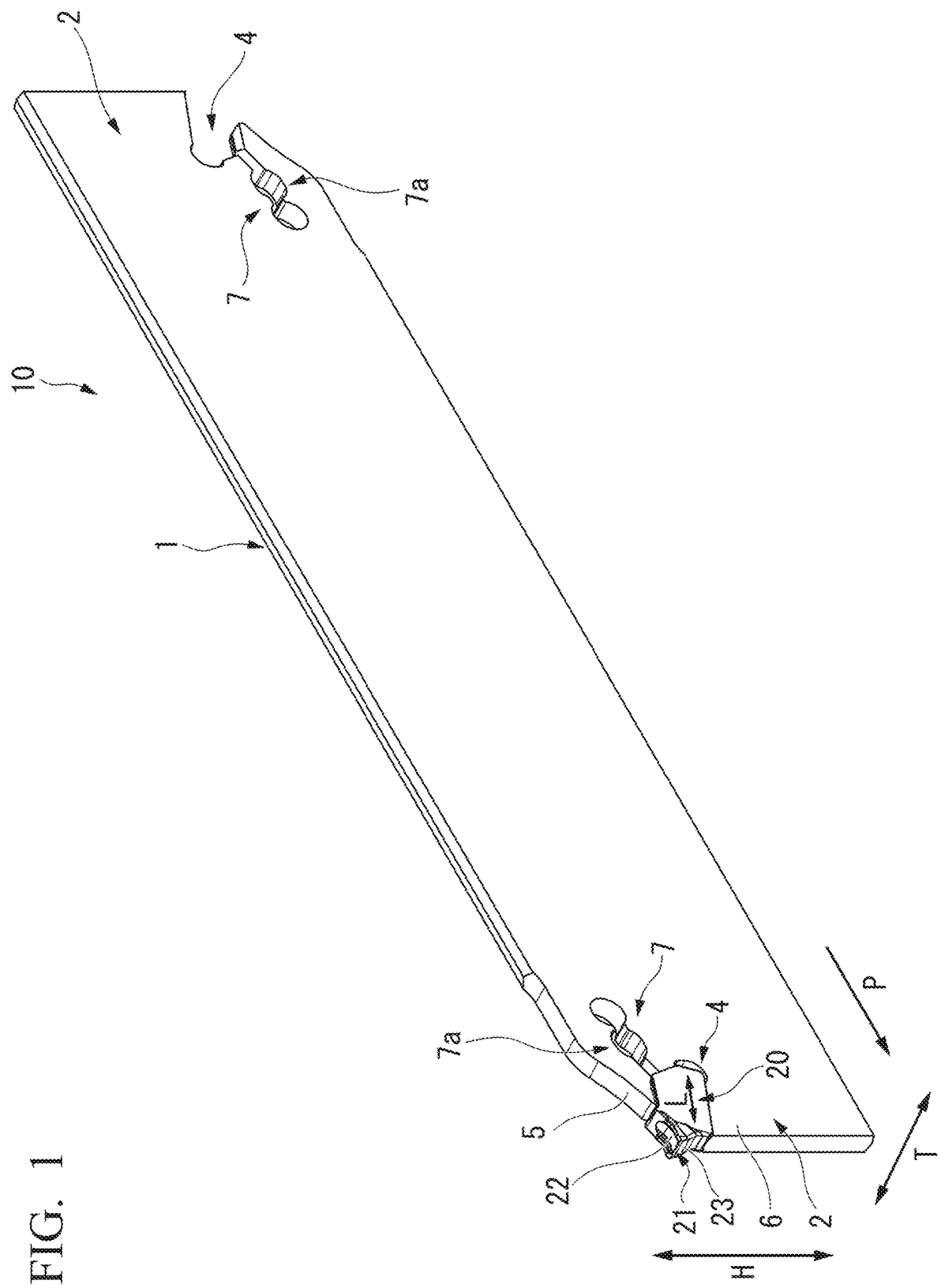
FIG. 1 is a perspective view illustrating an indexable grooving tool according to an embodiment of the present invention.

Hereinafter, an indexable grooving tool 10 of an embodiment of the present invention, an insert clamping mechanism 30 thereof, and a clamping tool 40 will be described with reference to the drawings.

[Schematic Configuration of Indexable Grooving Tool and Insert Clamping Mechanism Thereof]

For example, the indexable grooving tool 10 of the present embodiment performs lathe turning processing (turning processing) such as outer-diameter grooving, cutting-off, inner-diameter grooving, and end surface grooving with respect to a cutting target material which is formed of a metal material or the like and has a columnar shape or a cylindrical shape. In the example of the present embodiment, the indexable grooving tool 10 is mainly used for performing outer-diameter grooving and cutting-off.

As illustrated in FIG. 1 to FIG. 4, the indexable grooving tool 10 includes a tool main body 1 which is formed of a steel material or the like, and a grooving cutting insert 20 which is formed of a sintered hard alloy or the like and is mounted in an insert mounting seat 4 of the tool main body 1 in an attachable/detachable manner.

In the present embodiment, the tool main body 1 has a rectangular plate shape, and insert holding plate portions 2 are respectively provided in end portions (distal end portions) in a direction in which the tool main body 1 extends. In the example of the present embodiment, the insert holding plate portions 2 of the tool main body 1 and portions other than the insert holding plate portions 2 are formed into plate shapes having thicknesses substantially the same as each other, and the tool main body 1 has a flat plate shape in its entirety.

The insert mounting seat 4 penetrates the insert holding plate portion 2 in a thickness direction T of the insert holding plate portion 2 and is formed to extend in a slit shape. That is, the insert mounting seat 4 is open on both side surfaces oriented in the thickness direction T of the insert holding plate portion 2 (front and rear surfaces). In addition, in both end portions of the insert mounting seat 4 along an extending direction L, one end portion (insert insertion port) is open on an end surface of the insert holding plate portion 2 (in the example of the present embodiment, a distal end surface of the tool main body 1).

The grooving cutting insert 20 is mounted in the insert mounting seat 4 in a state where a cutting edge 21 protrudes from one end portion of the insert mounting seat 4.

In addition, a slit-shaped opening-closing operation slit 7 penetrating the insert holding plate portion 2 in the thickness direction T is formed in the insert holding plate portion 2. The opening-closing operation slit 7 communicates with the other end portion of the both end portions along the extending direction L of the insert mounting seat 4 (in the vicinity of a rear wall 4c of the insert mounting seat 4).

In addition, the clamping tool 40 is inserted into the opening-closing operation slit 7 in an attachable/detachable manner.

In addition, the tool main body 1 is mounted a machining tool such as an NC lathe (not illustrated particularly) in an attachable/detachable manner via a clamping member sandwiching the tool main body 1 from both sides in its height direction H (that is, a vertical direction).

[Definition of Orientation (Direction) Used in the Present Embodiment]

In the present embodiment, an orientation in which the insert holding plate portions 2 provided in the distal end portions of the tool main body 1 protrude from portions other than the insert holding plate portion 2 (portions other than the distal end portions of the tool main body 1) will be referred to as a protruding direction P. At the time of grooving, the protruding direction P is the same orientation as a "grooving direction" in which the indexable grooving tool 10 is moved with respect to the cutting target material.

In the example of the present embodiment, in a top view of the tool main body 1 in which a cutting surface 22 of the grooving cutting insert 20 is seen from the front, the protruding direction P extends along a tool axis line of the tool main body 1 (extending direction of the tool main body 1, that is, a major axis direction of the tool main body 1). In addition, the protruding direction P is a direction toward the end portion from the middle of the tool (middle of the tool main body 1) along the tool axis line of the tool main body 1 (left side in FIG. 3). Moreover, in the present embodiment, the end portion of each of the portions on the protruding direction P side will be sometimes referred to as the distal end portion.

In addition, an orientation along the thickness of the insert holding plate portion 2 will be referred to as the thickness direction T. In the example of the present embodiment, the protruding direction P is orthogonal to the thickness direction T.

In addition, an orientation orthogonal to the extending direction of the tool main body 1 (protruding direction P) and the thickness direction T will be referred to as the height direction H. In the height direction H, a direction in which the cutting surface 22 of the cutting edge 21 of the grooving cutting insert 20 is oriented (upper side in FIG. 3) at the time of grooving will be referred to as upward, and a side opposite to the direction in which the cutting surface 22 is oriented (lower side in FIG. 3) will be referred to as downward.

In the present embodiment, a direction in which the opening-closing operation slit 7 extends in the insert holding plate portion 2 is directed substantially along the protruding direction P. Therefore, the vertical direction (slit width direction) in which an upper wall 8 and a lower wall 9 of the opening-closing operation slit 7 face each other is the same direction as the height direction H as well. Thus, in the following description, the vertical direction will be sometimes referred by using the reference sign H.

Figure 3:
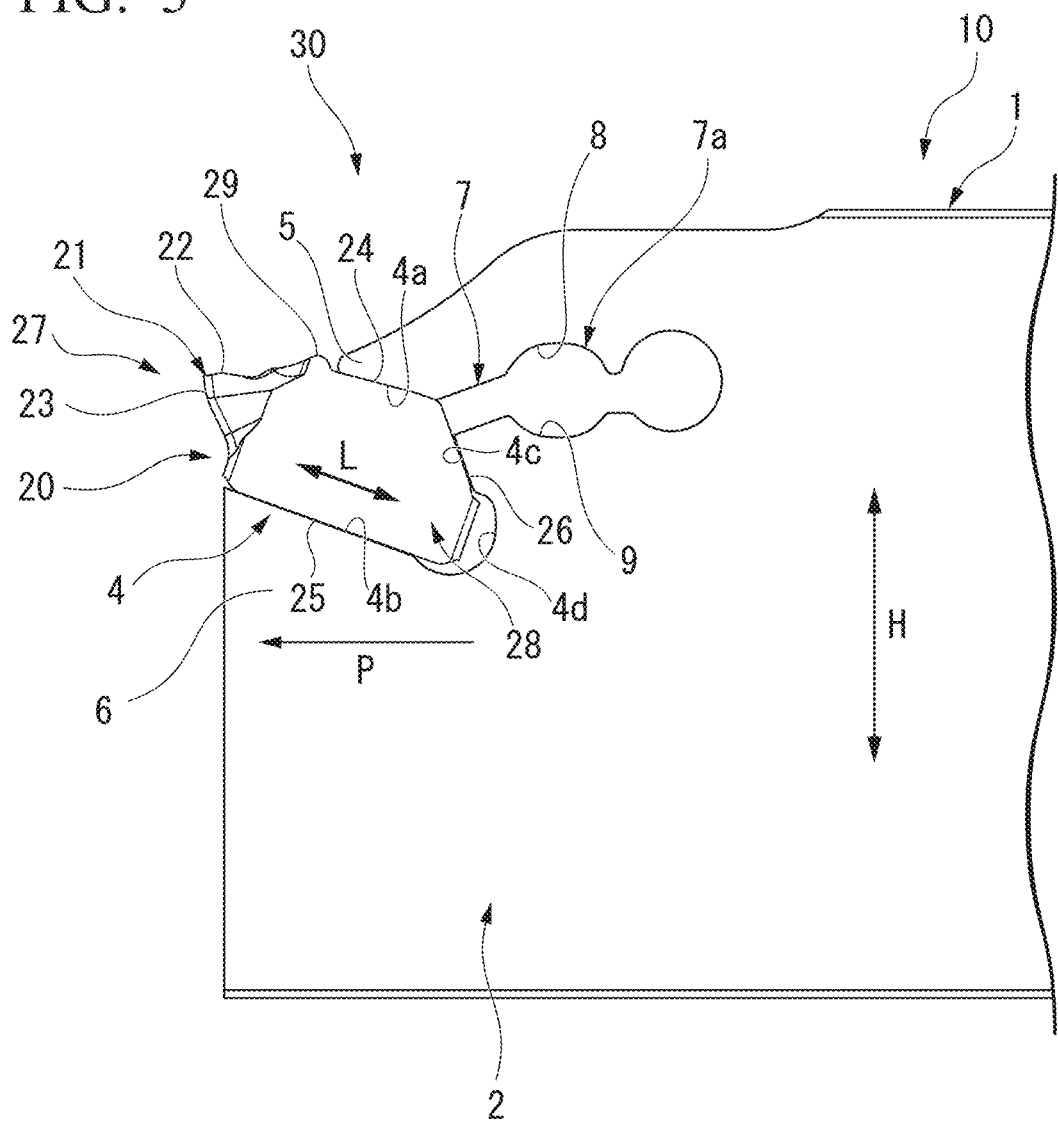
FIG. 3 is an enlarged view illustrating a main part of the indexable grooving tool in FIG. 2.

In the example of the present embodiment, a direction in which the insert mounting seat 4 formed in the insert holding plate portion 2 extends (extending direction L) differs from the protruding direction P, and the extending direction of the tool main body 1. As illustrated in FIG. 3, when seen in the thickness direction T of the insert holding plate portion 2, the extending direction L of the insert mounting seat 4 is not parallel to the protruding direction P of the insert holding plate portion 2 but is inclined upward in the height direction H gradually toward the protruding direction P.

In description or the like of the insert mounting seat 4 below, in FIG. 3, a direction toward an opening portion (insert insertion port) of the insert mounting seat 4 from the rear wall 4*c* along the extending direction L will be referred to as one end portion side in the extending direction L, and a direction toward the rear wall 4*c* from the opening portion along the extending direction L will be sometimes referred to as the other end portion side in the extending direction L (side opposite to one end portion in the extending direction L).

In addition, the grooving cutting insert 20 is formed into a rod shape, and its extending direction is the same as the extending direction L of the insert mounting seat 4 in which the grooving cutting insert 20 is mounted. Therefore, in the present embodiment, the extending direction of the grooving cutting insert 20 will be expressed by applying the same reference sign L as the extending direction L of the insert mounting seat 4.

In description or the like of the grooving cutting insert 20 below, in FIG. 3, a direction toward a blade portion 27 side from a clamping target portion 28 along the extending direction L will be referred to as one end portion side in the extending direction L, and a direction toward the clamping target portion 28 side from the blade portion 27 along the extending direction L will be sometimes referred to as the other end portion side in the extending direction L (side opposite to one end portion in the extending direction L).

In addition, the thickness direction of the grooving cutting insert 20 is the same as the thickness direction T of the insert holding plate portion 2. Therefore, in the present embodiment, the thickness direction of the grooving cutting insert 20 will be expressed by applying the same reference sign T as the thickness direction T of the insert holding plate portion 2.

[Tool Main Body]

Figure 2:
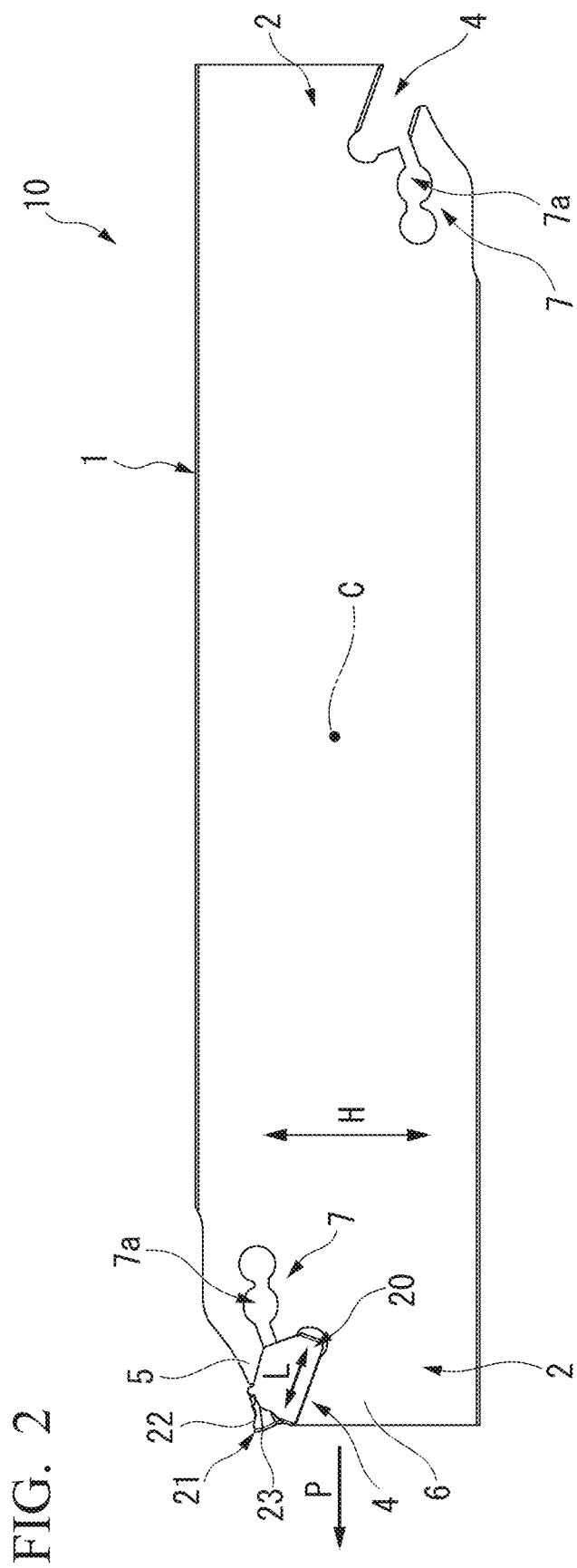
FIG. 2 is a side view illustrating the indexable grooving tool.

As illustrated in FIG. 1 and FIG. 2, the tool main body 1 is formed to have rotational symmetry by 180° with regard to a tool center line C which passes through the center of its extending direction and the center of the height direction H and extends along the thickness direction T. In addition, a set of the insert mounting seat 4 and the opening-closing operation slit 7 is disposed in each of both end portions of the tool main body 1 in the extending direction.

In the example of the present embodiment, the pair of insert mounting seats 4 is disposed to have rotational symmetry by 180° around the tool center line C passing through each of the centers of both side surfaces oriented in the thickness direction T of the tool main body 1 and is formed into the same shape as each other. In addition, the pair of opening-closing operation slits 7 is disposed to have rotational symmetry by 180° around the tool center line C and is formed into the same shape as each other.

Only one set of the insert mounting seat 4 and the opening-closing operation slit 7 may be provided in the tool main body 1.

Figure 4:
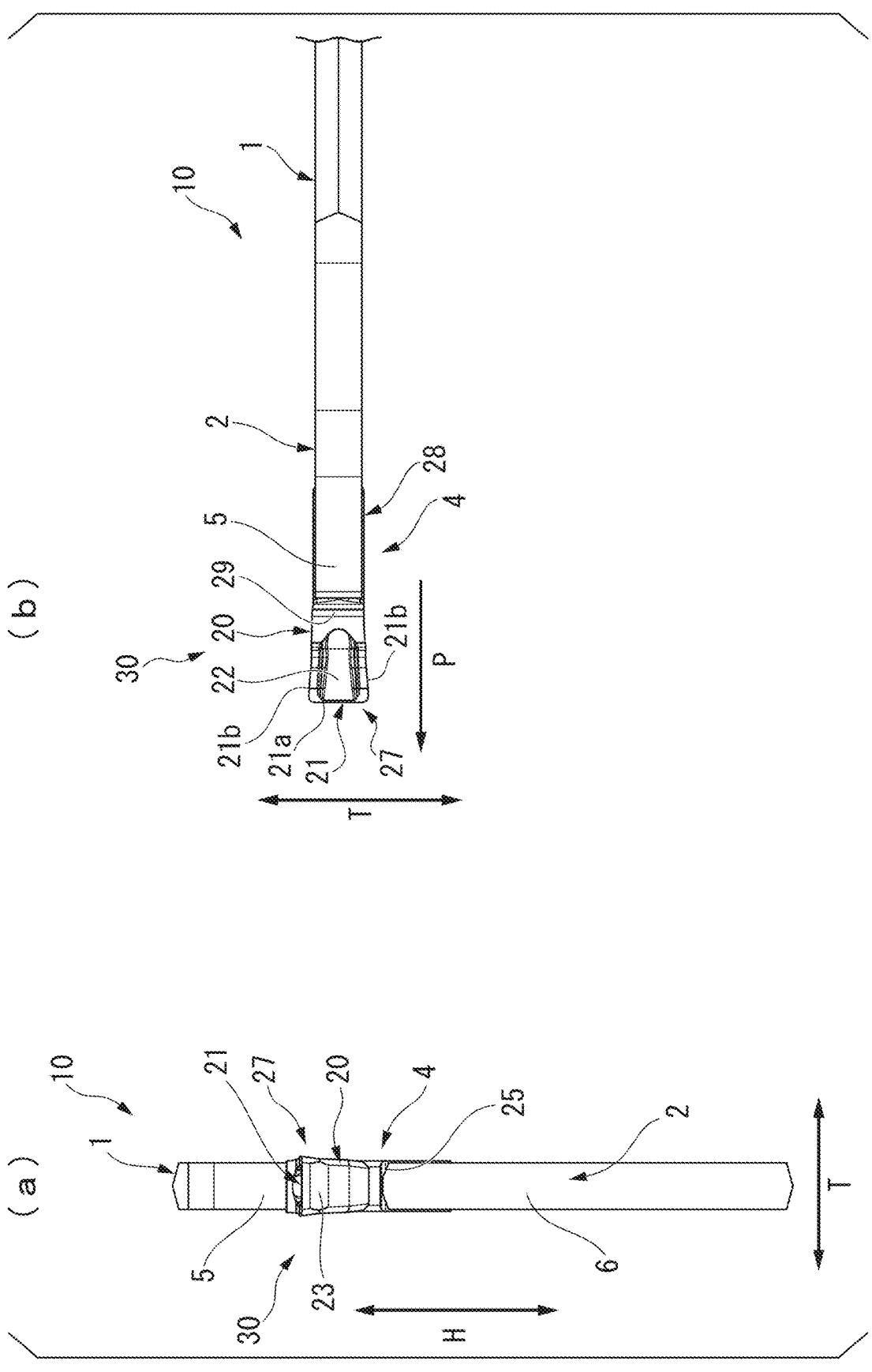
FIG. 4 illustrates the indexable grooving tool.

As illustrated in FIG. 1, FIG. 2, and FIG. 4(*a*), an upper surface and a lower surface oriented in the height direction H of the tool main body 1 extend along the extending direction of the tool main body 1. In at least portions other than the insert holding plate portion 2 on the upper surface and the lower surface of the tool main body 1, a cross-sectional shape perpendicular to the extending direction of the tool main body 1 has a projected V-shape.

[Insert Holding Plate Portion]

In FIG. 1 to FIG. 3, the insert holding plate portion 2 includes an upper jaw portion 5 and a lower jaw portion 6 facing each other in the height direction H. The upper jaw portion 5 and the lower jaw portion 6 are separated from each other in the height direction H, and the insert mounting seat 4 and the opening-closing operation slit 7 are formed as slit-shaped gaps provided therebetween.

[Upper Jaw Portion and Lower Jaw Portion]

A distal end portion of the upper jaw portion 5 in the protruding direction P has a substantially triangular plate shape. A distal end portion of the lower jaw portion 6 in the protruding direction P has a substantially square plate shape. The insert mounting seat 4 is disposed between the distal end portion of the upper jaw portion 5 in the protruding direction P and the distal end portion of the lower jaw portion 6 in the protruding direction P. The opening-closing operation slit 7 is disposed between a part other than the distal end portion of the upper jaw portion 5 and a part other than the distal end portion of the lower jaw portion 6.

The length (height) of the upper jaw portion 5 along the height direction H is smaller than the length of the lower jaw portion 6 along the height direction H. The height of the distal end portion of the upper jaw portion 5 in the protruding direction P decreases toward the protruding direction P. The height of the distal end portion of the lower jaw portion 6 in the protruding direction P increases toward the protruding direction P.

The length (protrusion length) of the upper jaw portion 5 along the protruding direction P is shorter than the length of the lower jaw portion 6 along the protruding direction P. That is, the distal end of the lower jaw portion 6 in the protruding direction P is disposed to protrude in the protruding direction P beyond the distal end of the upper jaw portion 5 in the protruding direction P.

The upper jaw portion 5 is formed to be elastically deformable. Specifically, the upper jaw portion 5 is elastically deformed and is deformed to be restored, thereby being pivotable substantially along the height direction H about the end portion of the upper jaw portion 5 on the opposite side in the protruding direction P (specifically, a part positioned above the end portion of the opening-closing operation slit 7 on the opposite side in the protruding direction P) and being able to be close to and separated from the lower jaw portion 6.

That is, the insert holding plate portion 2 is formed to be elastically deformable in an orientation in which the upper jaw portion 5 and the lower jaw portion 6 are separated from each other, and a restoring deformation force causing the upper jaw portion 5 and the lower jaw portion 6 to be close to each other is generated in a state where the insert holding plate portion 2 is elastically deformed in this manner.

A coolant hole (not illustrated particularly) open toward the cutting edge 21 of the grooving cutting insert 20 may be formed in at least any one of the upper jaw portion 5 and the lower jaw portion 6. The coolant hole passes through the inside of the tool main body 1 and is connected to coolant supply means of a machining tool (not illustrated). A coolant (oil-based or water-soluble liquid agent for cutting) supplied from the coolant supply means circulates inside the coolant hole.

[Insert Mounting Seat]

In FIG. 1 to FIG. 4, the insert mounting seat 4 is disposed in an upper part of the insert holding plate portion 2 in the height direction H. The insert mounting seat 4 is open on both side surfaces oriented in the thickness direction T of the insert holding plate portion 2, and one end portion (part in which an insert is inserted) of both end portions along the extending direction L of the insert mounting seat 4 is open on the distal end surface of the insert holding plate portion 2 (end surface orientated in the protruding direction P).

As illustrated in FIG. 3, the rear wall 4c and a thinned portion 4d (which will be described below) are disposed in the other end portion (part on which the insert abuts) of both end portions along the extending direction L of the insert mounting seat 4. In addition, the opening-closing operation slit 7 is connected to the other end portion of the insert mounting seat 4.

The insert mounting seat 4 extends to be gradually inclined upward in the height direction H toward the protruding direction P. In FIG. 3, in an acute angle and an obtuse angle formed between the extending direction L of the insert mounting seat 4 and the protruding direction P, the acute angle ranges from 15° to 30°, for example. However, the range is not limited thereto.

The insert mounting seat 4 has a top wall 4a which comes into contact with an upper surface 24 of the grooving cutting insert 20, a bottom wall 4b which comes into contact with a lower surface 25 of the grooving cutting insert 20, and the rear wall 4c which comes into contact with a rear surface 26 of the grooving cutting insert 20.

As illustrated in FIG. 3, in the example of the present embodiment, the contact length (contact surface) of each of the walls 4a, 4b, and 4c of the insert mounting seat 4 with respect to the grooving cutting insert 20 is reduced in order of the bottom wall 4b, the top wall 4a, and the rear wall 4c. That is, the contact length of the bottom wall 4b is the largest, the contact length of the rear wall 4c is the smallest, and the contact length of the top wall 4a has a size therebetween.

The top wall 4a and the bottom wall 4b of the insert mounting seat 4 are gradually inclined upward in the height direction H toward the protruding direction P. The bottom wall 4b of the insert mounting seat 4 extends along the extending direction L of the insert mounting seat 4.

In the example of the present embodiment, as illustrated in FIG. 3, in a state where the grooving cutting insert 20 is mounted in the insert mounting seat 4, the top wall 4a of the insert mounting seat 4 is inclined with respect to the bottom wall 4b to be gradually close to the bottom wall 4b toward one end portion (insert insertion port) side from the other end portion (rear wall 4c) along the extending direction L of the insert mounting seat 4.

That is, in FIG. 3 the top wall 4a and the bottom wall 4b are not parallel to each other but become gradually close to each other toward the one end portion side in the extending direction L. However, as described above, the upper jaw portion 5 is configured to be elastically deformable. When the grooving cutting insert 20 is inserted in the insert mounting seat 4, the upper jaw portion 5 is elastically deformed in advance, so that the top wall 4a and the bottom wall 4b become substantially parallel to each other.

However, the embodiment is not limited thereto. The top wall 4a and the bottom wall 4b may be parallel to each other in a state where the grooving cutting insert 20 is mounted in the insert mounting seat 4.

The rear wall 4c of the insert mounting seat 4 is gradually inclined upward in the height direction H toward the protruding direction P. In the present embodiment, the rear wall 4c of the insert mounting seat 4 is brought into contact with the upper part of an upper part (inclined wall) and a lower part (vertical wall) on the rear surface 26 of the grooving cutting insert 20. As illustrated in FIG. 3, when the insert holding plate portion 2 is seen in the thickness direction T, in an acute angle and an obtuse angle formed between the bottom wall 4b and the rear wall 4c of the insert mounting seat 4 the acute angle ranges from 40° to 70°, for example. However, the range is not limited thereto.

The thinned portion 4d recessed having a shape is formed between the bottom wall 4b and the rear wall 4c of the insert mounting seat 4. In addition, the top wall 4a and the rear wall 4c of the insert mounting seat 4 are divided by the opening-closing operation slit 7. In other words, the insert mounting seat 4 and the opening-closing operation slit 7 communicate with each other through a space between the top wall 4a and the rear wall 4c of the insert mounting seat 4.

In the insert mounting seat 4, the top wall 4a is formed in the upper jaw portion 5. The bottom wall 4b, the rear wall 4c, and the thinned portion 4d are formed in the lower jaw portion 6.

The top wall 4a of the insert mounting seat 4 is formed into a projected V-shape projected toward the bottom wall 4b side (not illustrated particularly) in a cross-sectional view perpendicular to the extending direction L of the insert mounting seat 4. The bottom wall 4b of the insert mounting seat 4 is formed into a projected V-shape projected toward the top wall 4a side in a cross-sectional view perpendicular to the extending direction L of the insert mounting seat 4. In addition, the rear wall 4c of the insert mounting seat 4 is formed into a flat surface shape.

[Opening-Closing Operation Slit]

As illustrated in FIG. 1 to FIG. 3, the opening-closing operation slit 7 penetrates the insert holding plate portion 2 in the thickness direction T in the distal end portion of the tool main body 1 and is open on both side surfaces oriented in the thickness direction T of the insert holding plate portion 2.

The opening-closing operation slit 7 is disposed in a part positioned on a side opposite to the insert mounting seat 4 in the protruding direction P in the insert holding plate portion 2 (on an inner side of the tool along the extending direction of the tool main body 1, that is, on the middle side of the tool). The opening-closing operation slit 7 extends from a part communicating with the insert mounting seat 4 toward the opposite side in the protruding direction P.

In FIG. 3, one end portion (part connected to the other end portion of the insert mounting seat 4) of the opening-closing operation slit 7 in the extending direction (extending direction of the tool main body 1) is formed such that the slit width becomes uniform. In the example of the present embodiment, one end portion of the opening-closing operation slit 7 extends to be gradually inclined downward in the height direction H toward the protruding direction P.

A round hole having an inner diameter greater than the slit width of the one end portion is formed in the other end portion of the opening-closing operation slit 7 in the extending direction (end portion positioned on a side opposite to the insert mounting seat 4). In addition, in the other end portion of the opening-closing operation slit 7 in the extending direction, a part positioned on one end portion side of the round hole along the extending direction is formed to have a slit width smaller than the inner diameter of the round hole (slit width substantially the same as the slit width of the one end portion).

Similar to the one end portion, the other end portion of the opening-closing operation slit 7 may be formed to have a uniform slit width without having a round hole formed therein (not illustrated particularly).

Figure 5:
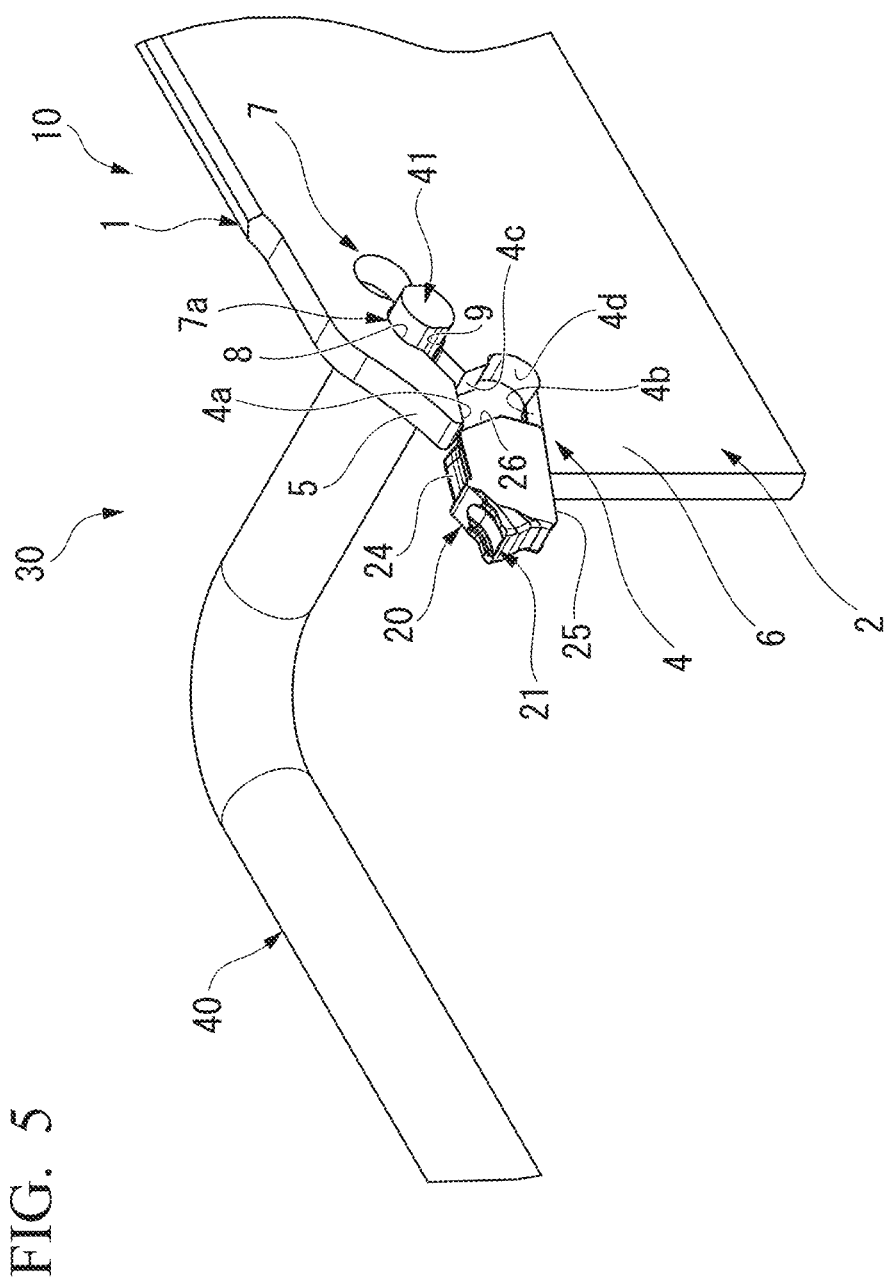
FIG. 5 is a diagram describing a procedure of attaching and detaching a grooving cutting insert with respect to an insert mounting seat.
Figure 6:
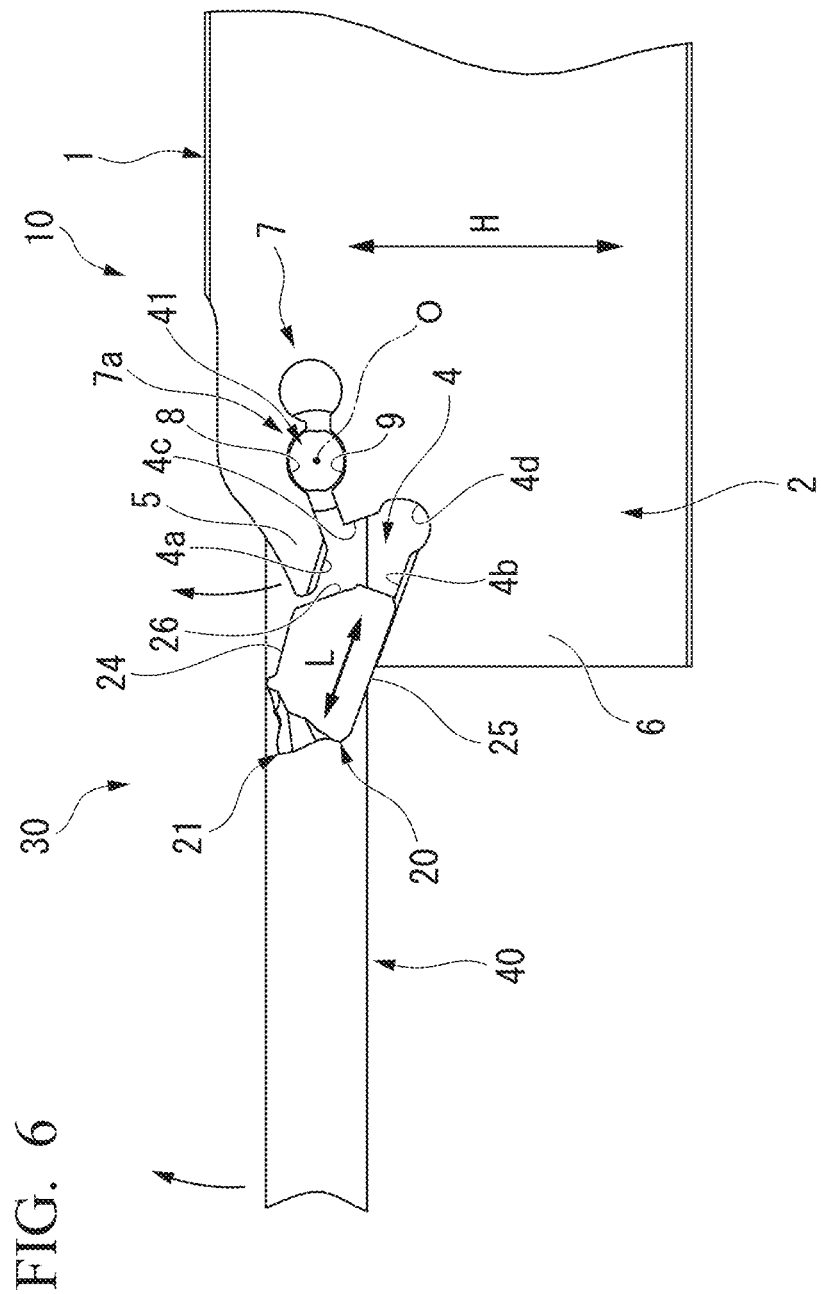
FIG. 6 is a diagram describing the procedure of attaching and detaching the grooving cutting insert with respect to the insert mounting seat.
Figure 7:
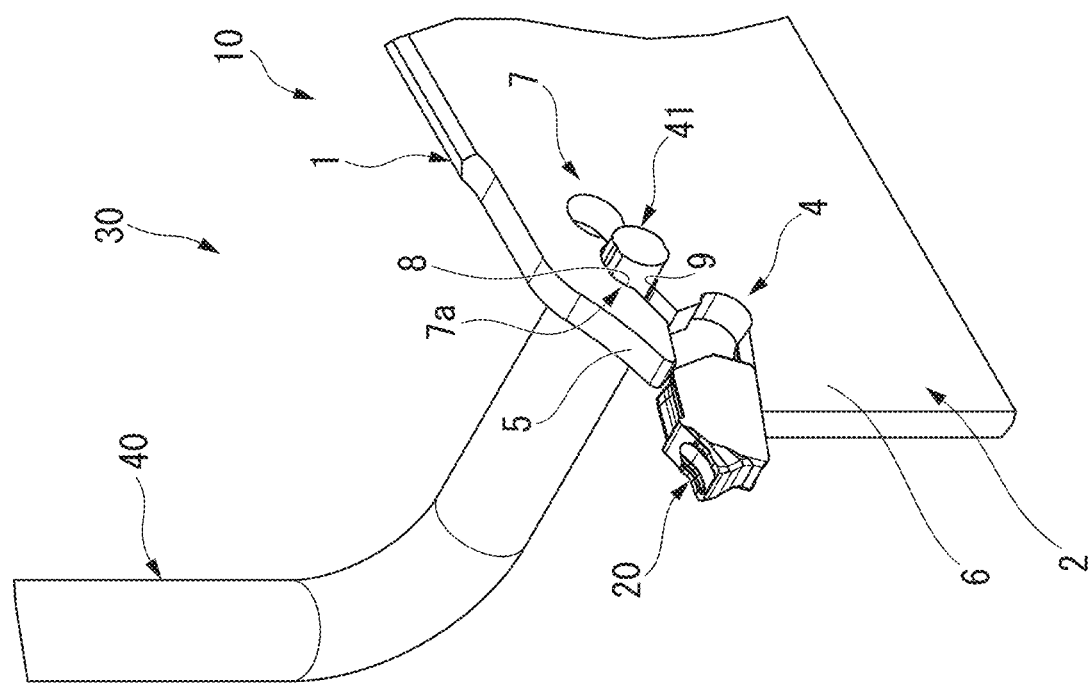
FIG. 7 is a diagram describing the procedure of attaching and detaching the grooving cutting insert with respect to the insert mounting seat.
Figure 8:
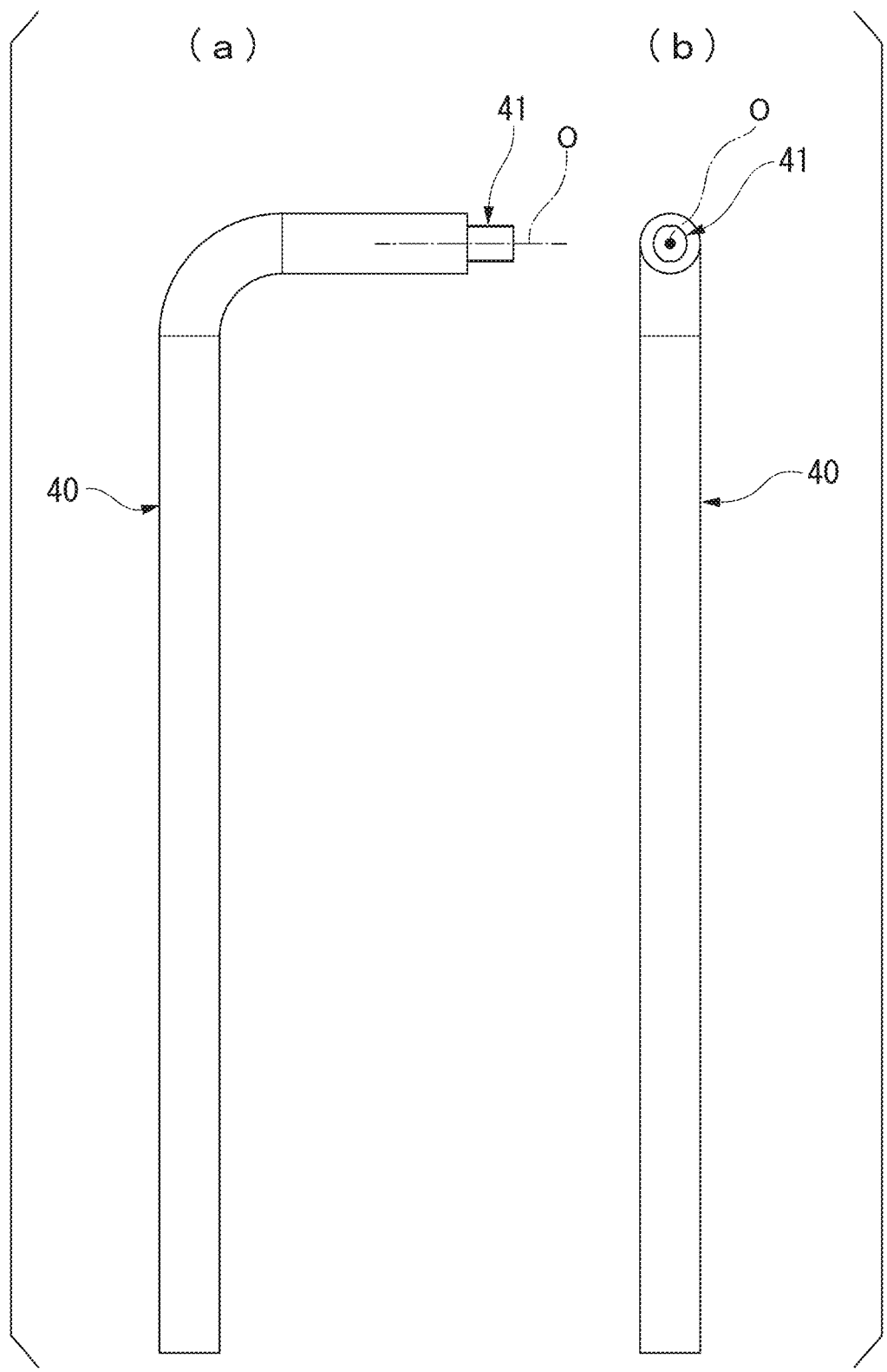
FIG. 8 illustrates a clamping tool.

A shaft portion insertion hole 7a, into which the clamping tool 40 is inserted, is formed in an intermediate part positioned between both end portions of the opening-closing operation slit 7 in the extending direction (refer to FIG. 5 to FIG. 7).

Figure 10:
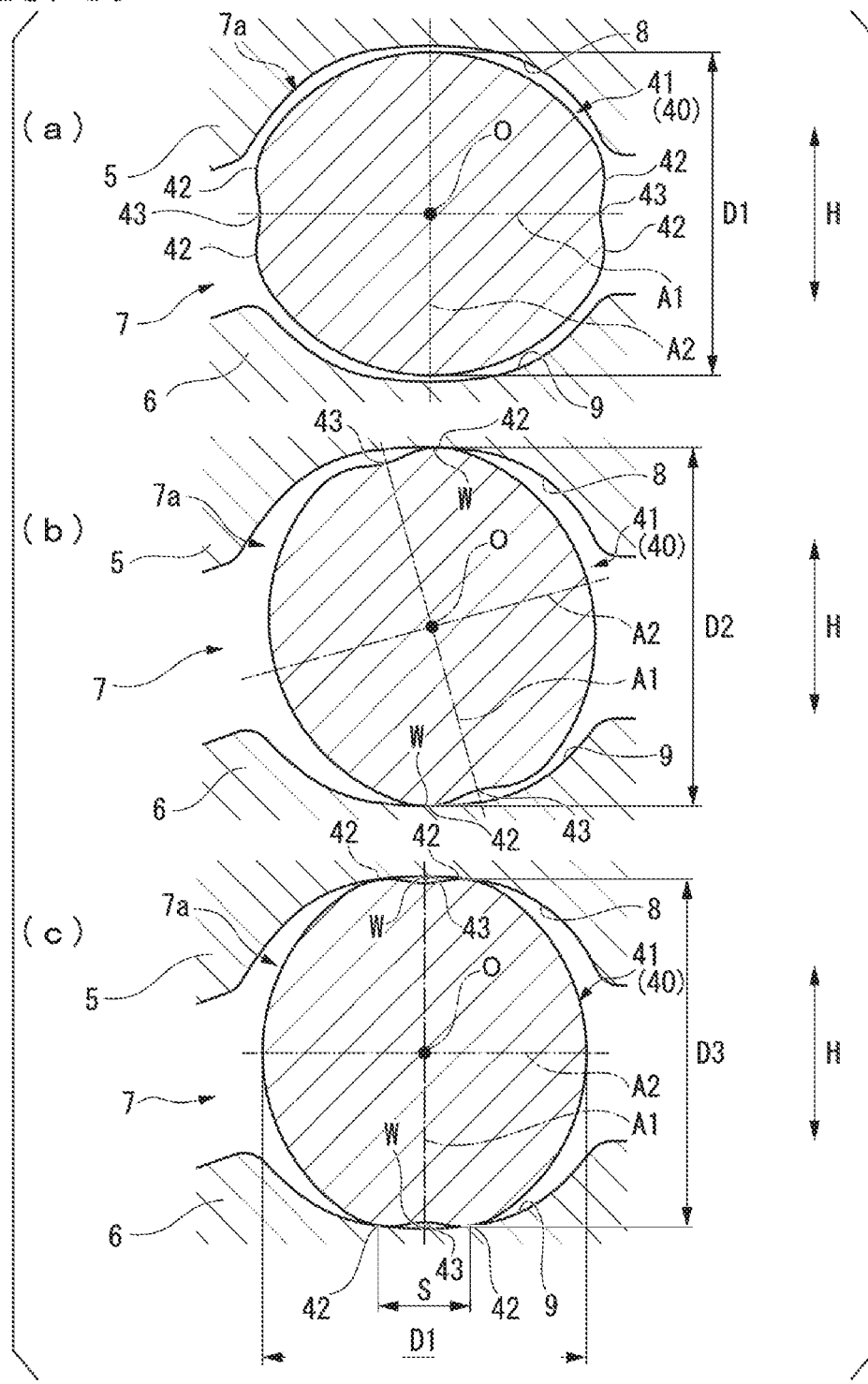
FIG. 10 is a cross-sectional view perpendicular to a center axis of a shaft portion.

In FIG. 3 and FIG. 10, the upper wall 8 and the lower wall 9 disposed to face each other in the height direction H in a separated manner are formed in the shaft portion insertion hole 7a. A shaft portion 41 of the clamping tool 40 is removably inserted between the upper wall 8 and the lower wall 9. Each of the upper wall 8 and the lower wall 9 is formed into a recessed curve surface shape. The length of the shaft portion insertion hole 7a along the height direction H (that is, the distance (height) between the upper wall 8 and the lower wall 9 along the vertical direction H in which the upper wall 8 and the lower wall 9 face each other) is greater than each of the slit parts disposed to be adjacent to both sides of the shaft portion insertion hole 7a along the extending direction of the opening-closing operation slit 7.

As illustrated in FIGS. 10(a) to 10(c), in a cross-sectional view perpendicular to the thickness direction T of the tool main body 1 (in a cross-sectional view perpendicular to a center axis O of the shaft portion 41 (which will be described below) of the clamping tool 40, that is, in a cross-sectional view perpendicular to the center axis O of the shaft portion insertion hole 7a), each of the upper wall 8 and the lower wall 9 has a recessed curve line shape.

Specifically, in this cross-sectional view, a plurality of recessed curve lines differing from each other in radius of curvature are smoothly connected to each other, so that the upper wall 8 is formed into a recessed curve line shape in its entirety. In addition, a plurality of recessed curve lines differing from each other in radius of curvature are smoothly connected to each other, so that the lower wall 9 is formed into a recessed curve line shape in its entirety.

Specifically, in the cross-sectional view, the radius of curvature of a sliding portion positioned between both end portions of the upper wall 8 is greater than each of the radii of curvature of both end portions of the upper wall 8 along the extending direction of the opening-closing operation slit 7 (traverse direction that is a direction orthogonal to the vertical direction H). In addition, in the cross-sectional view, the radius of curvature of a sliding portion positioned between both end portions of the lower wall 9 is greater than each of the radii of curvature of both end portions of the lower wall 9 along the extending direction of the opening-closing operation slit 7.

In the cross-sectional views illustrated in FIGS. 10(a) to 10(c), when the shaft portion 41 of the clamping tool 40 is inserted into the shaft portion insertion hole 7a of the opening-closing operation slit 7, a middle portion of the sliding portion positioned between both end portions of the entire upper wall 8 is disposed to be closest to the center axis O of the shaft portion 41 (center axis O of the shaft portion insertion hole 7a). In addition, a middle portion of the sliding portion positioned between both end portions of the entire lower wall 9 is disposed to be closest to the center axis O of the shaft portion 41.

In the example of the present embodiment, with regard to a virtually flat plane passing through the center of the upper wall 8 and the lower wall 9 in the height direction H and being perpendicular to the height direction H (that is, a virtually flat plane passing through a hole center (center axis O) of the shaft portion insertion hole 7a and being perpendicular to the vertical direction H in which the upper wall 8 and the lower wall 9 face each other), the upper wall 8 and the lower wall 9 are formed to have substantial surface symmetry. In addition, the upper wall 8 and the lower wall 9 are formed to have substantially rotational symmetry by 180° with respect to each other about the hole center (center axis O) of the shaft portion insertion hole 7a. However, the upper wall 8 and the lower wall 9 are not limited to a configuration having a symmetrical shape with respect to each other.

As described above, the insert holding plate portion 2 is formed to be elastically deformable in the orientation in which the upper jaw portion 5 and the lower jaw portion 6 are separated from each other. Focusing on the opening-closing operation slit 7 in this regard, the insert holding plate portion 2 is configured to be elastically deformable such that the upper wall 8 and the lower wall 9 are separated from each other. Then, a restoring deformation force of causing the upper wall 8 and the lower wall 9 to be close to each other is generated in a state of being elastically deformed.

[Grooving Cutting Insert]

As illustrated in FIG. 3, the grooving cutting insert 20 is formed into a rod shape. The blade portion 27 having the cutting edge 21 is formed in one end portion of both end portions along the extending direction L of the grooving cutting insert 20, and the clamping target portion 28 to be clamped in the insert mounting seat 4 is formed in portions other than one end portion.

In FIG. 3, when the grooving cutting insert 20 is mounted in the insert mounting seat 4, the blade portion 27 of the grooving cutting insert 20 protrude out of the insert mounting seat 4 from one end portion (opening portion) of the extending direction L of the insert mounting seat 4.

In the example of the present embodiment, the blade portion 27 is formed into a substantially triangular plate shape, and the clamping target portion 28 has a substantially pentagonal plate shape.

[Blade Portion]

As illustrated in FIG. 4(b), the length (thickness) of the blade portion 27 along the thickness direction T is greater than the length of the clamping target portion 28 along the thickness direction T. In addition, the thickness of the blade portion 27 is greater than the thickness of the insert holding plate portion 2. The thickness of the blade portion 27 gradually increases toward the one end portion side in the extending direction L (toward the blade portion 27 side from the clamping target portion 28 along the extending direction L).

As illustrated in FIG. 3, the length (height) of the blade portion 27 in the height direction H gradually decreases toward the one end portion side in the extending direction L.

The blade portion 27 has the cutting surface 22, a relief surface 23, and the cutting edge 21 formed in an intersecting ridge line portion between the cutting surface 22 and the relief surface 23.

The cutting surface 22 is formed on the upper surface of the blade portion 27. The relief surface 23 is formed on the end surface (front surface, anterior surface) of the blade portion 27 orientated in the one end portion side in the extending direction L and both side surfaces oriented in the thickness direction T of the blade portion 27. In a top view of the tool illustrated in FIG. 4(b) (in a top view of the grooving cutting insert 20), the cutting edge 21 has a laid U-shape or a U-shape open toward the other end portion side in the extending direction L.

The cutting edge 21 protrudes the most toward the one end portion side in the extending direction L in the blade portion 27 and protrudes the most toward both sides in the thickness direction T.

As illustrated in FIG. 4(b), the cutting edge 21 has a main cutting edge (front surface cutting edge) 21a which is positioned at an end edge of the one end portion side in the extending direction L in the blade portion 27 and extends along the thickness direction T, and a pair of auxiliary cutting edges (side surface cutting edges) 21b which is connected to both ends of the main cutting edge 21a and extends toward the other end portion side in the extending direction L from the main cutting edge 21a.

In the example of the present embodiment, both end portions connected to the auxiliary cutting edges 21b in the main cutting edge 21a are formed into rounded corners (corner blades) having a projected round shape. Both end portions of the main cutting edge 21a may be chamfered corners (corner blades) in place of the rounded corners (not illustrated particularly). On the other hand, the rounded corners or the chamfered corner do not have to be formed.

In addition, the pair of auxiliary cutting edges 21b extends to be gradually close to each other toward the other end portion side in the extending direction L from the main cutting edge 21a, and so-called back tapering is applied to the auxiliary cutting edges 21b. Parts serving as flat drags which extend to be orthogonal to each other in the thickness direction T may be respectively provided in the auxiliary cutting edges 21b (not illustrated particularly).

As illustrated in FIG. 3 and FIG. 4(b), a protrusion 29 protruding upward in the height direction H is formed in a part positioned on a side opposite to the cutting edge 21 of the cutting surface 22 (specifically, the main cutting edge 21a) in the blade portion 27. The protrusion 29 is disposed between the cutting surface 22 of the blade portion 27 and the upper surface 24 of the clamping target portion 28 (which will be described below) and extend along the thickness direction T.

As illustrated in FIG. 3, in a state where the grooving cutting insert 20 is installed in the insert mounting seat 4, the protrusion 29 disposed to be adjacent to a distal end of the upper jaw portion 5 in the protruding direction P in a manner covering the distal end.

[Clamping Target Portion]

In FIG. 3, the clamping target portion 28 has the upper surface 24 oriented in the same direction (upward in the height direction H) as the cutting surface 22, the lower surface 25 oriented toward a side opposite (downward in the height direction H) to that of the upper surface 24, and the rear surface 26 oriented toward a side opposite (the other end portion side in the extending direction L) to that of one end portion along the extending direction L.

The lower surface 25 of the clamping target portion 28 extends along the extending direction L of the grooving cutting insert 20.

In addition, at least one end portion in the extending direction L on the upper surface 24 of the clamping target portion 28 is formed to be inclined with respect to the lower surface 25 so as to be gradually close to the lower surface 25 toward the one end portion side in the extending direction L. When the grooving cutting insert 20 is mounted in the insert mounting seat 4, at least the one end portion on the upper surface 24 is brought into contact with the top wall 4a.

The shape of each of the upper surface 24 and the lower surface 25 of the clamping target portion 28 (refer to FIG. 4(a)) in a cross-sectional view perpendicular to the extending direction L forms a recessed V-shape.

Therefore, in FIG. 3, when the grooving cutting insert 20 is mounted in the insert mounting seat 4, the top wall 4a having a projected V-shape in a cross section in the insert mounting seat 4, and the upper surface 24 having a recessed V-shape in a cross section in the grooving cutting insert 20 come into contact (are interlocked) with each other in a state where relative movement in the thickness direction T is regulated. In addition, similarly, the bottom wall 4b having a projected V-shape in a cross section in the insert mounting seat 4, and the lower surface 25 having a recessed V-shape in a cross section in the grooving cutting insert 20 come into contact with each other in a state where relative movement in the thickness direction T is regulated.

In the example of the present embodiment, both the upper surface 24 and the lower surface 25 of the grooving cutting insert 20 have a recessed V-shape in a cross section, and both the top wall 4a and the bottom wall 4b of the insert mounting seat 4 have a projected V-shape in a cross section, so that both the set of the top wall 4a and the upper surface 24, and the set of the bottom wall 4b and the lower surface 25 (two sets) are fitted to have a cross-sectional V-shape. However, only one set of the two sets may be configured to be fitted to have a cross-sectional V-shape. In this case, for example, the other set of the two sets may have a configuration in which flat surfaces not having a cross-sectional V-shape come into contact with each other.

In addition, the constituent element having a recessed V-shape in a cross section and the constituent element having a projected V-shape in a cross section may be replaced with each other. Specifically, the top wall 4a having a recessed V-shape in a cross section in the insert mounting seat 4, and the upper surface 24 having a projected V-shape in a cross section in the grooving cutting insert 20 may come into contact with each other in a state where relative movement of the thickness direction T is regulated. In addition, the bottom wall 4b having a recessed V-shape in a cross section in the insert mounting seat 4, and the lower surface 25 having a projected V-shape in a cross section in the grooving cutting insert 20 may come into contact with each other in a state where relative movement of the thickness direction T is regulated.

That is, at least any one of the upper surface 24 and the lower surface 25 of the grooving cutting insert 20 need only be formed into a V-shape (including a recessed V-shape and a projected V-shape) in a cross-sectional view perpendicular to the extending direction L. In addition, in a manner corresponding thereto, at least any one of the top wall 4a and the bottom wall 4b of the insert mounting seat 4 need only be formed into a V-shape (including a projected V-shape and a recessed V-shape) in a cross-sectional view perpendicular to the extending direction L.

In FIG. 3, the rear surface 26 of the clamping target portion 28 has an inclined wall positioned at the upper part in the height direction H and a vertical wall positioned at the lower part in the height direction H in the rear surface 26.

The inclined wall is connected to the upper surface 24. The inclined wall is gradually inclined toward the one end portion side in the extending direction L toward the upper surface 24 from the lower surface 25 along the height direction of the grooving cutting insert 20 (height direction of the insert orthogonal to the extending direction L in FIG. 3). As illustrated in FIG. 3, in a side view in which the grooving cutting insert 20 is seen in the thickness direction T, in an acute angle and an obtuse angle formed between the inclined wall of the rear surface 26 and the lower surface 25, the acute angle ranges from 40° to 70°, for example. However, the range is not limited thereto.

The vertical wall is connected to the lower surface 25. In the example of the present embodiment, as illustrated in FIG. 3, in a side view in which the grooving cutting insert 20 is seen in the thickness direction T, an angle formed between the lower surface 25 and the vertical wall is substantially 90°.

In addition, each of the inclined wall of the rear surface 26 and the vertical wall is formed into a flat surface shape. In the present embodiment, as illustrated in FIG. 3, in a state where the grooving cutting insert 20 is mounted in the insert mounting seat 4, the rear wall 4c having a flat surface shape in the insert mounting seat 4 is brought into contact with the inclined wall on the rear surface 26.

In the example of the present embodiment, each of the inclined wall of the rear surface 26 and the rear wall 4c which come into contact with each other is formed into a flat surface shape. However, in place thereof, the inclined wall may be formed into a recessed V-shape in a cross section or a projected V-shape in a cross section, and the rear wall 4c may be formed into a projected V-shape in a cross section or a recessed V-shape in a cross section in a manner corresponding thereto.

[Clamping Tool]

As illustrated in FIG. 5 to FIG. 10, the clamping tool 40 has the shaft portion 41 to be inserted between the upper wall 8 and the lower wall 9 of the opening-closing operation slit 7. The shaft portion 41 is fitted into the shaft portion insertion hole 7a such that its center axis O substantially coincides with the hole center (center axis O) of the shaft portion insertion hole 7a of the opening-closing operation slit 7. The shaft portion 41 inserted into the shaft portion insertion hole 7a is rotatable around the center axis O with respect to the shaft portion insertion hole 7a. When the shaft portion 41 is rotated, as in the cross-sectional views illustrated in FIGS. 10(a) to 10(c), the outer circumference of the shaft portion 41 is in slide contact with the sliding portion positioned between both end portions in the upper wall 8 of the shaft portion insertion hole 7a, and the sliding portion positioned between both end portions in the lower wall 9.

In the example of the present embodiment, the clamping tool 40 has an L-shape in its entirety. In addition, the outer diameter of the shaft portion 41 is smaller than the outer diameters of portions other than the shaft portion 41. However, the embodiment is not limited thereto. The outer diameter of the shaft portion 41 and the outer diameters of the portions other than the shaft portion 41 may be the same as each other, or the outer diameter of the shaft portion 41 may be greater than the outer diameters of the portions other than the shaft portion 41. In addition, for example, the clamping tool 40 may have an I-shape or a T-shape in its entirety or may have a working tool shape with a handle including a gripping portion.

Figure 9:
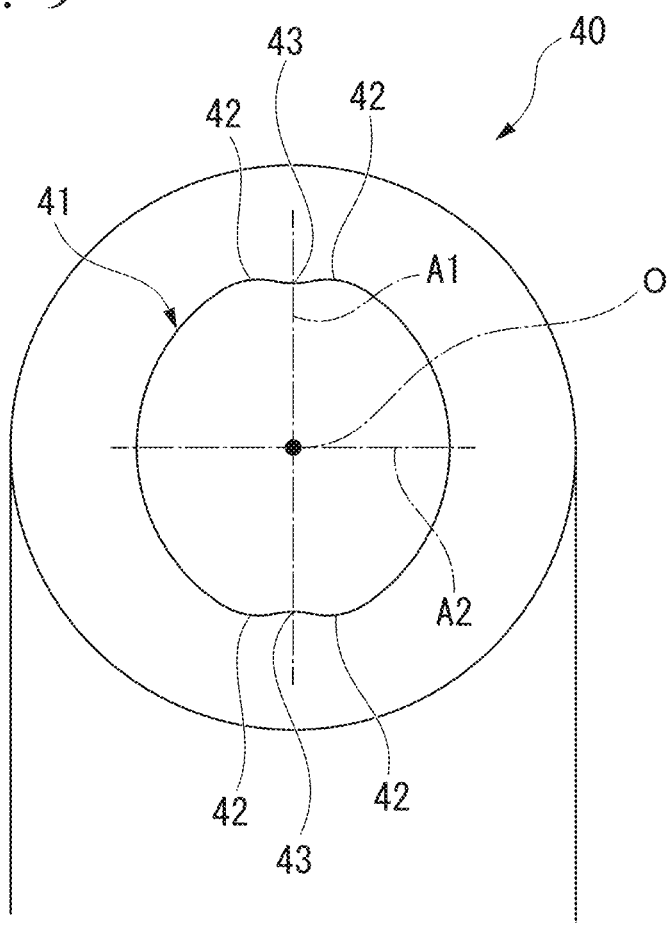
FIG. 9 is an enlarged view illustrating a main part of the clamping tool.

FIG. 9 is a front view of the shaft portion 41 seen in the direction of its center axis O. In the shaft portion 41, a cross-sectional shape perpendicular to the center axis O is uniform in the entire region along the direction of the center axis O. Thus, the shape of the end surface of the shaft portion 41 illustrated in FIG. 9 is the same as the shape of a cross section perpendicular to the center axis O of the shaft portion 41. In a cross-sectional view perpendicular to the center axis O, the shaft portion 41 has a major axis A1 and a minor axis A2 orthogonal to each other on the center axis O. In the example of the present embodiment, the shaft portion 41 has an elliptical shape including the major axis A1 and the minor axis A2 in a cross-sectional view. In addition, an axis having the smallest outer diameter of the shaft portion 41 passing through the center axis O is the minor axis A2.

However, the embodiment is not limited thereto. The shaft portion 41 may have an oval shape or a polygonal shape, for example, having the major axis A1 and the minor axis A2 in the cross-sectional view. Therefore, the "outer diameter" of the shaft portion 41 mentioned in the present embodiment includes "exterior dimensions" of the shaft portion 41.

As illustrated in FIGS. 10(a) to 10(c), in a cross-sectional view perpendicular to the center axis O of the shaft portion 41 in a state where the shaft portion 41 is inserted into the shaft portion insertion hole 7a of the opening-closing operation slit 7, an outer diameter D1 of the shaft portion 41 in a minor axis A2 direction is less than a distance between the upper wall 8 and the lower wall 9 (that is, the distance between the upper wall 8 and the lower wall 9 along the minor axis A2 direction in FIG. 10(a), which is the minimum diameter of the inner diameters of the shaft portion insertion hole 7a) through the center axis O along the vertical direction H, and an outer diameter D3 of the shaft portion 41 in a major axis A1 direction (maximum value of dimensions of the shaft portion 41 in the major axis A1 direction) with respect to the distance.

Then, in a cross-sectional view perpendicular to the center axis O of the shaft portion 41, in both end portions (pair of end portions) 43 positioned on the major axis A1 in the outer circumference of the shaft portion 41, at least one end portion 43 is formed into a recessed shape or a linear shape and is disposed not to come into contact with the upper wall 8 and the lower wall 9 of the opening-closing operation slit 7. In addition, support portions 42 having the largest outer diameter in the shaft portion 41 are respectively formed in parts adjacent to the end portions 43 on both sides around the center axis O along the shaft portion 41.

In the example of the present embodiment, in the cross-sectional view, each of both end portions 43 positioned on the major axis A1 in the outer circumference of the shaft portion 41 is formed into a recessed shape. Specifically, as illustrated in FIG. 5 and FIG. 7, a groove extending along the direction of the center axis O is formed in each of both end portions 43 positioned on the major axis A1 in the outer circumference of the shaft portion 41. In addition, in the outer circumference of the shaft portion 41, the support portions 42 having a projection shape (rib shape) extending along the direction of the center axis O are respectively formed in parts adjacent to both sides of the groove (end portion 43 positioned on the major axis A1) around the center axis O.

That is, in the example of the present embodiment, a pair of grooves open toward a side opposite to the center axis O (direction separated from the center axis O) is formed in the outer circumference of the shaft portion 41, and a bottom portion of the groove becomes the end portion 43. In addition, the grooves are disposed with rotational symmetry by 180° in a back-to-back manner about the center axis O. In addition, two sets of a pair of support portions 42 (that is, two pairs of support portions 42) disposed in a separated manner around the center axis O with one groove interposed therebetween are formed in the outer circumference of the shaft portion 41, and the sets of the support portions 42 are disposed with rotational symmetry by 180° in a back-to-back manner about the center axis O. The pair of support portions 42 disposed in a separated manner around the center axis O with one groove interposed therebetween is formed to have line symmetry with respect to the major axis A1.

In the example of the present embodiment, in a cross-sectional view perpendicular to the center axis O of the shaft portion 41 illustrated in FIG. 9 and FIG. 10, the groove has a recessed curve line shape and the support portion 42 has a projected curve line shape, so that they are smoothly connected to each other with no step, in the outer circumference of the shaft portion 41.

Then, in the outer circumference of the shaft portion 41, each of the grooves is formed such that the inner surface of each of the grooves positioned in both end portions in the major axis A1 direction is in non-contact with (cannot come into contact with) the upper wall 8 and the lower wall 9 of the shaft portion insertion hole 7a. Meanwhile, in the outer circumference of the shaft portion 41, the pair of support portions 42 disposed to be adjacent to both sides around the center axis O with respect to the groove (end portion 43) positioned on the major axis A1 comes into contact with (can come into contact with) the upper wall 8 and the lower wall 9 of the shaft portion insertion hole 7a.

In the present embodiment, in a part positioned on the major axis A1 in the outer circumference of the shaft portion 41, a groove having a depressed recess shape is formed in an orientation of being close to the center axis O, and the end portion 43 is disposed inside the groove. Accordingly, in accordance therewith, the middle portion of each of the sliding portions (part having the minimum diameter in the shaft portion insertion hole 7a) of the upper wall 8 and the lower wall 9 in the shaft portion insertion hole 7a of the opening-closing operation slit 7 may be formed to have a flat surface shape. Even in a case of having such a configuration, the inner surface (end portion 43) of the groove positioned on the major axis A1 in the outer circumference of the shaft portion 41 is in non-contact with (cannot come into contact with) the upper wall 8 and the lower wall 9 of the opening-closing operation slit 7.

That is, in the present embodiment, when the shaft portion 41 is rotated around the center axis O with respect to the opening-closing operation slit 7, the upper wall 8 and the lower wall 9 of the opening-closing operation slit 7, and the end portion 43 positioned on the major axis A1 in the outer circumference of the shaft portion 41 are individually formed not to come into contact with each other throughout the entire circumference around the center axis O.

In a cross-sectional view perpendicular to the center axis O of the shaft portion 41, each of both end portions 43 positioned on the major axis A1 in the outer circumference of the shaft portion 41 may be formed into a linear shape (not illustrated particularly). That is, in the cross-sectional view, the end portions 43 may have a linear shape extending along the minor axis A2 direction. In this case, in the outer circumference of the shaft portion 41, a slender flat surface (having a belt shape) extending along the direction of the center axis O is formed in each of both end portions 43 positioned on the major axis A1. In addition, in the outer circumference of the shaft portion 41, the projection-shaped support portions 42 extending along the direction of the center axis O are respectively formed in parts adjacent to both sides around the center axis O on the flat surface (end portion 43 positioned on the major axis A1).

In this case as well, in a cross-sectional view perpendicular to the center axis O of the shaft portion 41 as described above, since each of the upper wall 8 and the lower wall 9 of the shaft portion insertion hole 7a is formed into a recessed curve line shape, each of the flat surfaces (end portions 43) positioned on the major axis A1 in the outer circumference of the shaft portion 41 is in non-contact with (cannot come into contact with) the upper wall 8 and the lower wall 9 of the shaft portion insertion hole 7a. Then, in the outer circumference of the shaft portion 41, the pair of support portions 42 disposed to be adjacent to both sides around the center axis O with respect to the flat surfaces (end portions 43) positioned on the major axis A1 comes into contact with (can come into contact with) the upper wall 8 and the lower wall 9 of the shaft portion insertion hole 7a.

As illustrated in FIGS. 10(a) to 10(c), in a cross-sectional view perpendicular to the center axis O of the shaft portion 41, the following relationship is established among the outer diameter D1 along the minor axis A2 direction of the shaft portion 41, the outer diameter D3 along the major axis A1 direction of the shaft portion 41, and an outer diameter passing through the support portions 42 of the shaft portion 41 (outer diameter passing through protruding ends of the support portions 42 and the center axis O) D2.

Outer diameter D2>outer diameter D3>outer diameter D1

Specifically, the outer diameter D2 becomes the maximum diameter in the shaft portion 41, and the outer diameter D1 becomes the minimum diameter. In addition, the outer diameter D3 is a distance between the support portions 42 positioned in regions oriented toward both sides (both outer sides) in the major axis A1 direction in the outer circumference of the shaft portion 41 and indicates the exterior dimensions of the shaft portion 41 along the major axis A1 direction.

The outer diameter of the shaft portion 41 gradually increases toward portions on the support portions 42 from a portion on the minor axis A2 around the center axis O along the outer circumference of the shaft portion 41. In addition, the outer diameter of the shaft portion 41 gradually decreases toward a portion on the major axis A1 from portions on the support portion 42 around the center axis O along the outer circumference of the shaft portion 41.

As illustrated in FIG. 10(c), in a cross-sectional view perpendicular to the center axis O of the shaft portion 41, in the outer circumference of the shaft portion 41, a distance S between the pair of support portions 42 disposed around the center axis O in a separated manner with the end portion 43 positioned on the major axis A1 interposed therebetween is in a range from ⅛ to ⅓ times the outer diameter D1 of the shaft portion 41 in the minor axis A2 direction.

That is, the distance S (distance in the minor axis A2 direction) between parts (protruding ends of the support portions 42) having the largest outer diameter in the pair of support portions 42 disposed to be adjacent to both sides around the center axis O with respect to the end portion 43 positioned on the major axis A1 (groove in the example of the present embodiment) in the outer circumference of the shaft portion 41 is in a range from ⅛ to ⅓ times the outer diameter D1 of the shaft portion 41.

[Method of Attaching and Detaching Insert Mounting Seat with Respect to Grooving Cutting Insert]

Next, with reference to FIG. 3, FIG. 5 to FIG. 7, and FIG. 10, a method of attaching and detaching the grooving cutting insert 20 with respect to the insert mounting seat 4 will be described.

An operation is performed as follows in order to attach and detach the grooving cutting insert 20 with respect to the insert mounting seat 4 by using the insert clamping mechanism 30 of the indexable grooving tool 10 and the clamping tool 40.

As illustrated in FIG. 5 and FIG. 6, when the grooving cutting insert 20 is mounted in the insert mounting seat 4 in a state where the grooving cutting insert 20 is not mounted in the insert mounting seat 4, first, the shaft portion 41 of the clamping tool 40 is inserted between the upper wall 8 and the lower wall 9 of the opening-closing operation slit 7.

At this time, as illustrated in FIG. 10(a), in a cross-sectional view perpendicular to the center axis O of the shaft portion 41, the shaft portion 41 is disposed such that regions in the outer circumference of the shaft portion 41 oriented toward both sides (both outer sides) in the minor axis A2 direction respectively face the upper wall 8 and the lower wall 9. In this state, a gap is formed between each of the regions oriented in the minor axis A2 direction of the shaft portion 41, and each of the upper wall 8 and the lower wall 9 of the opening-closing operation slit 7. In this state, any one of the regions oriented toward both sides in the minor axis A2 direction in the outer circumference of the shaft portion 41, and the upper wall 8 or the lower wall 9 of the opening-closing operation slit 7 may come into contact with each other.

Subsequently, as illustrated in FIG. 7, FIG. 10(b), and FIG. 10(c), the clamping tool 40 is operated, and the shaft portion 41 is rotated around its center axis O by 90° with respect to the upper wall 8 and the lower wall 9 of the opening-closing operation slit 7. Accordingly, the regions in the outer circumference of the shaft portion 41 oriented toward both sides (both outer sides) in the major axis A1 direction are disposed to respectively face the upper wall 8 and the lower wall 9, and the pair of support portions 42 disposed around the center axis O in a separated manner with the end portion 43, which is interposed therebetween and is positioned on the major axis A1 in the outer circumference of the shaft portion 41, is brought into contact with the upper wall 8 or the lower wall 9 of the opening-closing operation slit 7, so that the shaft portion 41 pressurizes the upper wall 8 and the lower wall 9 in an orientation of being separated from each other (FIG. 10(c)).

Since the upper wall 8 and the lower wall 9 of the opening-closing operation slit 7 are pressurized in the orientation of being separated from each other, the upper jaw portion 5 of the insert holding plate portion 2 is elastically deformed, and the distance between the upper wall 8 and the lower wall 9 increases.

Consequently, the distance between the top wall 4a and the bottom wall 4b of the insert mounting seat 4 communicating with the opening-closing operation slit 7 also increases, so that the insert mounting seat 4 is in a state of being able to receive the grooving cutting insert 20 (hereinafter, this state will be referred to as an open state of the insert mounting seat 4, and will be sometimes referred to as a "stably open state" in a case of being distinguished from a "maximum open state" (which will be described below)). Then, the grooving cutting insert 20 can be inserted with respect to the insert mounting seat 4.

After the grooving cutting insert 20 is inserted into the insert mounting seat 4, the shaft portion 41 is rotated around its center axis O by 90° with respect to the upper wall 8 and the lower wall 9 of the opening-closing operation slit 7, as illustrated in FIG. 10(b) and FIG. 10(a). Accordingly, the regions in the outer circumference of the shaft portion 41 oriented toward both sides in the minor axis A2 direction are disposed to respectively face the upper wall 8 and the lower wall 9, and pressurization by the shaft portion 41 with respect to the upper wall 8 and the lower wall 9 is canceled (FIG. 10(a)).

If pressurization to the upper wall 8 and the lower wall 9 of the opening-closing operation slit 7 is canceled, the upper jaw portion 5 of the insert holding plate portion 2 is deformed to be restored, and the distance between the upper wall 8 and the lower wall 9 is reduced. Consequently, the distance between the top wall 4a and the bottom wall 4b of the insert mounting seat 4 communicating with the opening-closing operation slit 7 is also reduced, and the insert mounting seat 4 is in a state of clamping the grooving cutting insert 20, as illustrated in FIG. 3 (hereinafter, this state will be referred to as a closed state of the insert mounting seat 4).

If the grooving cutting insert 20 is clamped in the insert mounting seat 4, the shaft portion 41 of the clamping tool 40 is pulled out from the shaft portion insertion hole 7a of the opening-closing operation slit 7.

When the grooving cutting insert 20 is removed from the insert mounting seat 4, an operation may be performed in a reverse procedure of the procedure described above. That is, the insert mounting seat 4 is brought into the open state by operating the clamping tool 40, and then the grooving cutting insert 20 can be removed from the insert mounting seat 4.

[Operational Effect of the Present Embodiment]

According to the insert clamping mechanism 30 of the indexable grooving tool 10 and the clamping tool 40 of the present embodiment, the shaft portion 41 of the clamping tool 40 is formed into an elliptical shape having the major axis A1 and the minor axis A2 in a cross-sectional view perpendicular to its center axis O. Then, in this cross-sectional view, at least one end portion 43 of the pair of end portions (both end portions) 43 positioned on the major axis A1 in the outer circumference of the shaft portion 41 is formed into a recessed shape (that is, a groove shape) or a linear shape (that is, a flat surface shape) and is in non-contact with the upper wall 8 and the lower wall 9 of the opening-closing operation slit 7. In addition, the support portions 42 having the largest outer diameter in the shaft portion 41 are respectively formed in the parts adjacent to the end portions 43 on both sides around the center axis O along the shaft portion 41.

That is, in the present embodiment, when the clamping tool 40 is operated, as illustrated in FIG. 10(b), the support portion 42 having the largest outer diameter in the outer circumference of the shaft portion 41 is strongly rubbed against each of parts W closest to the center axis O of the shaft portion 41 in the upper wall 8 and the lower wall 9 of the opening-closing operation slit 7 (in the present embodiment, each of the middle portions of the sliding portions of the upper wall 8 and the lower wall 9). Therefore, as the clamping tool 40 is repetitively operated, the part (middle portion of the sliding portion) W of the upper wall 8 and the part (middle portion of the sliding portion) W of the lower wall 9 of the opening-closing operation slit 7 are more significantly worn out than other portions.

Then, as illustrated in FIG. 10(c), in a state where the regions oriented toward both sides of the shaft portion 41 in the major axis A1 direction are disposed to respectively face the upper wall 8 and the lower wall 9 of the opening-closing operation slit 7 (that is, when the insert mounting seat 4 is brought into the open state), both end portions 43 (in the example of the present embodiment, a pair of grooves) positioned on the major axis A1 in the outer circumference of the shaft portion 41 are disposed to respectively face the parts W in the upper wall 8 and the lower wall 9 which have been significantly worn out. Here, the end portion 43 positioned on the major axis A1 in the outer circumference of the shaft portion 41 are not brought into contact with the parts W in the upper wall 8 and the lower wall 9 which have been significantly worn out (end portion 43 are separated from the part W). In addition, the pair of support portions 42 disposed around the center axis O in a separated manner with the end portion 43 interposed therebetween in the outer circumference of the shaft portion 41 also does not come into contact with the parts W in the upper wall 8 and the lower wall 9 which have been significantly worn out.

Specifically, in FIG. 10(c), when the insert mounting seat 4 is brought into the open state, the support portions 42 of the shaft portion 41 are not brought into contact with the parts W in the upper wall 8 and the lower wall 9 of the opening-closing operation slit 7 which have been significantly worn out but are brought into contact with parts which have a small wear amount and are adjacent to the parts W having a large wear amount.

Therefore, for example, even in a case where the upper wall 8 and the lower wall 9 of the opening-closing operation slit 7 are worn out, the shaft portion 41 reliably pressurizes the upper wall 8 and the lower wall 9, so that the upper jaw portion 5 of the insert holding plate portion 2 can be elastically deformed in a stable manner and reduction of the amount of elastic deformation thereof can be remarkably suppressed.

Furthermore, the pair of support portions 42 of the shaft portion 41 is provided with the end portion 43 positioned on the major axis A1 interposed therebetween in the outer circumference of the shaft portion 41, and the outer diameter is maximized in the shaft portion 41, thereby exhibiting the following operational effects.

That is, as illustrated in FIG. 10(b), when the support portions 42 of the shaft portion 41 are in slide contact with the upper wall 8 and the lower wall 9 of the opening-closing operation slit 7 and go through those around the center axis O, the insert mounting seat 4 is brought into a maximally open state (maximum open state). Compared to this maximum open state, in the open state (stably open state, the posture of the shaft portion 41 illustrated in FIG. 10(c)) of the insert mounting seat 4, and the closed state (posture of the shaft portion 41 illustrated in FIG. 10(a)) of the insert mounting seat 4, the insert mounting seat 4 is in a state open less than the maximum open state. Therefore, in a process from the maximum open state of the insert mounting seat 4 to the stably open state and the closed state, a restoring deformation force of the upper jaw portion 5 of the insert holding plate portion 2 acts, so that an operator operating the clamping tool 40 can feel the touch (click feeling) with favorable operability.

In addition, in the open state (stably open state) of the insert mounting seat 4, since the pair of support portions 42 separated from each other is brought into contact with the upper wall 8 or the lower wall 9 of the opening-closing operation slit 7 (supported at two points), unintended pivoting around the center axis O of the shaft portion 41 with respect to the opening-closing operation slit 7 is minimized, and the posture of the shaft portion 41 is stabilized.

As described above, according to the present embodiment, even in a case where the upper wall 8 and the lower wall 9 of the opening-closing operation slit 7 are worn out, reduction of the amount of elastic deformation of the insert holding plate portion 2 can be suppressed, and the grooving cutting insert 20 can be stably clamped with respect to the insert mounting seat 4 in a long lasting manner.

In addition, even if the opening-closing operation slit 7 is worn out, since the period for replacement of the tool main body 1 can be elongated, the cost can be reduced by minimizing the frequency of replacing the tool main body 1.

In addition, in the present embodiment, as illustrated in FIG. 10(c), in a cross-sectional view perpendicular to the center axis O of the shaft portion 41, the distance S between the pair of support portions 42 disposed around the center axis O in a separated manner with the end portions 43 of the shaft portion 41 interposed therebetween is in a range from ⅛ to ⅓ times the outer diameter D1 of the shaft portion 41 in the minor axis A2 direction, thereby exhibiting the following operational effects.

That is, in this case, since the distance S between the pair of support portions 42 is ⅛ times or greater than that of the outer diameter D1 of the shaft portion 41 in the minor axis A2 direction and a sufficient length is ensured, when the insert mounting seat 4 is brought into the open state (stably open state), the support portions 42 can be disposed to be sufficiently separated from the parts W in the upper wall 8 and the lower wall 9 of the opening-closing operation slit 7 which have been significantly worn out. Accordingly, while the insert mounting seat 4 is in the open state, the support portions 42 of the shaft portion 41 can be reliably prevented from coming into contact with the parts W in the upper wall 8 and the lower wall 9 of the opening-closing operation slit 7 which have been significantly worn out, and the insert holding plate portion 2 can be elastically deformed in a stable manner, so that the above-described operational effects become more remarkable.

In addition, since the distance S between the pair of support portions 42 is ⅓ times or smaller than that of the outer diameter D1 of the shaft portion 41 in the minor axis A2 direction, it is possible to prevent the distance S between the support portions 42 from being excessively long and the outer diameter D3 of the shaft portion 41 in the major axis A1 direction from being short. That is, when a sufficiently large difference (D3−D1) between the outer diameter D3 in the major axis A1 direction and the outer diameter D1 in the minor axis A2 direction of the shaft portion 41 is ensured and the insert mounting seat 4 is brought into the open state (stably open state), a large distance between the top wall 4a and the bottom wall 4b of the insert mounting seat 4 can be ensured. Accordingly, attaching/detaching operability of the grooving cutting insert 20 with respect to the insert mounting seat 4 can be stably enhanced.

In addition, in the present embodiment, a groove having a recessed shape is formed in a part positioned on the major axis A1 in the outer circumference of the shaft portion 41 and the end portion 43 is disposed inside the groove (bottom portion of the groove), thereby exhibiting the following operational effects.

That is, in this case, in the outer circumference of the shaft portion 41, it is possible to ensure a significant difference between the distance from the groove bottom (end portion 43) of the groove positioned on the major axis A1 to the center axis O and the distance from the protruding end of the support portion 42 to the center axis O. Therefore, even in a case where the support portions 42 of the shaft portion 41 is abraded by repetitively performing an attaching/detaching operation of the insert, the above-described operational effects are stably exhibited in a long lasting manner. In addition, accordingly, the service life of the clamping tool 40 is also elongated.

[Other Configurations Included in the Present Invention]

The present invention is not limited to the embodiment described above, and various changes can be added within a range not departing from the gist of the present invention.

For example, in the example of the embodiment described above, the protruding direction P in which the insert holding plate portions 2 of the tool main body 1 protrude from portions other than the insert holding plate portions 2 (portions other than the distal end portion of the tool main body 1) extends along the tool axis line of the tool main body 1. However, the embodiment is not limited thereto. That is, for example, in a case where an indexable grooving tool is used for inner-diameter grooving or the like, in a top view of the tool main body 1 as illustrated in FIG. 4(b), the protruding direction P of the insert holding plate portion 2 may extend to intersect (for example, to be orthogonal to) the tool axis line of the tool main body 1.

In addition, in the embodiment described above, the upper jaw portion 5 of the upper jaw portion 5 and the lower jaw portion 6 of the insert holding plate portion 2 is formed to be elastically deformable. However, the embodiment is not limited thereto. That is, in the insert holding plate portion 2, the lower jaw portion 6 may be elastically deformable in place of the upper jaw portion 5, or both the upper jaw portion 5 and the lower jaw portion 6 may be elastically deformable.

In addition, in the embodiment described above, description has been given by using the indexable grooving tool 10 (indexable grooving cutting tool) for lathe turning processing (turning processing). However, the present invention can also be applied to the indexable grooving tool (indexable grooving cutter) for rolling cutting (milling).

In this case, for example, a tool main body has a disk shape and includes a plurality of insert holding plate portions 2 with a space therebetween in a circumferential direction around a tool axis line (rotary axis of the tool) along its outer circumference (not illustrated particularly). In addition, the thickness direction T of the insert holding plate portion 2 is parallel to the tool axis line. The insert mounting seat 4 and the opening-closing operation slit 7 formed in each of the insert holding plate portions 2 are formed to penetrate the insert holding plate portion 2 in the thickness direction T (direction of the tool axis line). In addition, one end portion (insert insertion port) along the extending direction L of the insert mounting seat 4 is open outward in a radial direction orthogonal to the tool axis line. Then, the shaft portion 41 of the clamping tool 40 is inserted into each shaft portion insertion hole 7a of the opening-closing operation slit 7 and is operated, so that the grooving cutting insert 20 is mounted in each insert mounting seat 4 in an attachable/detachable manner.

Furthermore, within a range not departing from the gist of the present invention, each of the configurations (constituent elements) described above in the embodiment, the modification example, the explanatory note, and the like may be combined. In addition, addition, omission, replacement, and other changes of the configuration can be made. In addition, the present invention is not limited to the embodiment described above and is limited to only Claims.

INDUSTRIAL APPLICABILITY

According to the present invention, even if an upper wall and a lower wall of an opening-closing operation slit are worn out, reduction of the amount of elastic deformation of an insert holding plate portion can be suppressed and a grooving cutting insert can be stably clamped with respect to an insert mounting seat in a long lasting manner.

REFERENCE SIGNS LIST

1: Tool main body
2: Insert holding plate portion
4: Insert mounting seat
7: Opening-closing operation slit
8: Upper wall
9: Lower wall
10: Indexable grooving tool
20: Grooving cutting insert
21: Cutting edge
30: Insert clamping mechanism of indexable grooving tool
40: Clamping tool
41: Shaft portion
42: Support portion
43: End portion
A1: Major axis
A2: Minor axis
D1: Outer diameter of shaft portion in minor axis direction (minimum diameter)
D2: Maximum diameter of shaft portion
D3: Outer diameter of shaft portion in major axis direction
H: Height direction (vertical direction)
L: Extending direction of insert mounting seat
O: Center axis of shaft portion (center axis of shaft portion insertion hole)
S: Distance between pair of support portions
T: Thickness direction

The invention claimed is:

1. An insert clamping mechanism of an indexable grooving tool, the insert clamping mechanism comprising:
an insert holding plate portion which is provided in a tool main body;
an insert mounting seat which penetrates the insert holding plate portion in a thickness direction of the insert holding plate portion, extends in a slit shape, and is configured for a grooving cutting insert having a cutting edge to be mounted detachably, one end portion of both end portions of the insert mounting seat along an extending direction being open on an end surface of the insert holding plate portion;

an opening-closing operation slit which is formed into a slit shape penetrating the insert holding plate portion in the thickness direction and communicates with the other end portion of the both end portions of the insert mounting seat along the extending direction; and a clamping tool which is configured to be inserted into the opening-closing operation slit, wherein an upper wall and a lower wall disposed to face each other in a separated manner are formed in the opening-closing operation slit, wherein the insert holding plate portion is configured to be elastically deformable such that the upper wall and the lower wall are separated from each other, wherein the clamping tool has a shaft portion configured to be inserted between the upper wall and the lower wall, and wherein in a cross-sectional view perpendicular to a center axis of the shaft portion, the shaft portion has a major axis and a minor axis orthogonal to each other on the center axis, an outer diameter of the shaft portion in a minor axis direction is less than a distance between the upper wall and the lower wall through the center axis along a vertical direction in which the upper wall and the lower wall face each other, and an outer diameter of the shaft portion in a major axis direction is more than the distance, at least one end portion of both end portions positioned on the major axis in an outer circumference of the shaft portion is formed into a recessed shape and is disposed not to come into contact with the upper wall and the lower wall, and support portions having a largest outer diameter in the shaft portion are respectively formed in parts adjacent to the end portions on both sides around the center axis along the shaft portion.

2. The insert clamping mechanism of an indexable grooving tool according to claim 1, wherein in a cross-sectional view perpendicular to the center axis of the shaft portion, a distance between a pair of the support portions disposed around the center axis in a separated manner with the end portions of the shaft portion interposed therebetween is in a range from ⅛ to ⅓ times the outer diameter of the shaft portion in the minor axis direction.

3. A clamping tool comprising a shaft portion which is configured to be inserted between an upper wall and a lower wall disposed to face each other in a separated manner in an opening-closing operation slit among an insert mounting seat and an opening-closing operation slit, which are formed to penetrate the insert holding plate portion in a thickness direction of the insert holding plate portion and communicate each other, wherein in a cross-sectional view perpendicular to a center axis of the shaft portion, the shaft portion has a major axis and a minor axis orthogonal to each other on the center axis, an outer diameter of the shaft portion in a minor axis direction is less than a distance between the upper wall and the lower wall through the center axis along a vertical direction in which the upper wall and the lower wall face each other, and an outer diameter of the shaft portion in a major axis direction is more than the distance, at least one end portion of both end portions positioned on the major axis in an outer circumference of the shaft portion is formed into a recessed shape and is disposed not to come into contact with the upper wall and the lower wall, and support portions having a largest outer diameter in the shaft portion are respectively formed in parts adjacent to the end portions on both sides around the center axis along the shaft portion.

4. The clamping tool according to claim 3, wherein in a cross-sectional view perpendicular to the center axis of the shaft portion, a distance between a pair of the support portions disposed around the center axis in a separated manner with the end portions of the shaft portion interposed therebetween is in a range from ⅛ to ⅓ times the outer diameter of the shaft portion in the minor axis direction.

* * * * *